(12) United States Patent
Yan

(10) Patent No.: US 9,886,678 B2
(45) Date of Patent: Feb. 6, 2018

(54) GRAPHIC REPRESENTATIONS OF PLANOGRAMS

(71) Applicant: Sui Yan, Mountain View, CA (US)

(72) Inventor: Sui Yan, Mountain View, CA (US)

(73) Assignee: SAP SE, Walldorf (DE)

( * ) Notice: Subject to any disclaimer, the term of this patent is extended or adjusted under 35 U.S.C. 154(b) by 146 days.

(21) Appl. No.: 14/037,121

(22) Filed: Sep. 25, 2013

(65) Prior Publication Data

US 2015/0088703 A1    Mar. 26, 2015

(51) Int. Cl.
*G06Q 10/08*    (2012.01)
*G06Q 20/20*    (2012.01)
*G06F 3/147*    (2006.01)
*G06F 17/30*    (2006.01)

(52) U.S. Cl.
CPC .......... *G06Q 10/087* (2013.01); *G06F 3/147* (2013.01)

(58) Field of Classification Search
USPC ..................................... 705/28; 707/E17.001
See application file for complete search history.

(56) References Cited

U.S. PATENT DOCUMENTS

| | | | |
|---|---|---|---|
| 5,671,362 A | 9/1997 | Cowe et al. | |
| 7,685,023 B1 | 3/2010 | Abraham et al. | |
| 8,175,925 B1 | 5/2012 | Rouaix | |
| 8,321,797 B2 | 11/2012 | Perkins | |
| 8,463,666 B2 | 6/2013 | Dorais et al. | |
| 8,570,343 B2 | 10/2013 | Halstead | |
| 2005/0216371 A1 | 9/2005 | Fotteler et al. | |
| 2007/0050235 A1 | 3/2007 | Ouimet | |
| 2008/0043013 A1 | 2/2008 | Gruttadauria | |
| 2008/0162261 A1 | 7/2008 | Velazquez et al. | |
| 2009/0059270 A1 | 3/2009 | Opalach et al. | |
| 2009/0063306 A1 | 3/2009 | Fano et al. | |
| 2009/0063307 A1* | 3/2009 | Groenovelt | G06Q 10/087 705/28 |
| 2009/0121017 A1 | 5/2009 | Cato et al. | |
| 2009/0259571 A1 | 10/2009 | Ebling et al. | |
| 2009/0313085 A1 | 12/2009 | Bhogal et al. | |

(Continued)

*Primary Examiner* — Scott Zare
*Assistant Examiner* — Reva R Danzig
(74) *Attorney, Agent, or Firm* — Fountainhead Law Group P.C.

(57) ABSTRACT

Systems and methods for generating and distributing graphic representations of planograms used for the configuration, maintenance, and compliance confirmation in the display of merchandise and advertisements, are disclosed. Based on predefined merchandizing agreements, planograms are designed to define specific configurations of products and advertising collateral in specific locations. By referencing an identifier associated with a location, a corresponding planogram can be retrieved and used to generate a graphic representation of the planogram. The graphic representation of the planogram can be adjusted and superimposed onto a live or captured image of the location to indicate where objects should be placed or rearranged. Each object specified in the planogram can be visually represented as a picture superimposed in a position over an image or live view of the location captured by a client computing device by a user. The user can reference the graphic representation to stock, rearrange, or maintain the location.

22 Claims, 14 Drawing Sheets

(56) References Cited

U.S. PATENT DOCUMENTS

| | | |
|---|---|---|
| 2010/0005052 A1* | 1/2010 | Maes ................ G06F 17/30041 |
| | | 707/E17.001 |
| 2010/0149093 A1 | 6/2010 | Edwards |
| 2011/0035257 A1 | 2/2011 | Solanki et al. |
| 2011/0050396 A1 | 3/2011 | Chaves |
| 2011/0110605 A1 | 5/2011 | Cheong |
| 2012/0089488 A1 | 4/2012 | Letchford |
| 2012/0330781 A1 | 12/2012 | Borrero |
| 2013/0117153 A1 | 5/2013 | Shen |
| 2014/0129354 A1 | 5/2014 | Soon-Shiong |
| 2014/0129395 A1 | 5/2014 | Groenovelt et al. |
| 2014/0195373 A1 | 7/2014 | Bassemir et al. |
| 2014/0201040 A1* | 7/2014 | Birch .................. G06Q 10/087 |
| | | 705/28 |
| 2014/0344118 A1 | 11/2014 | Parpia et al. |
| 2015/0046299 A1 | 2/2015 | Yan |

* cited by examiner

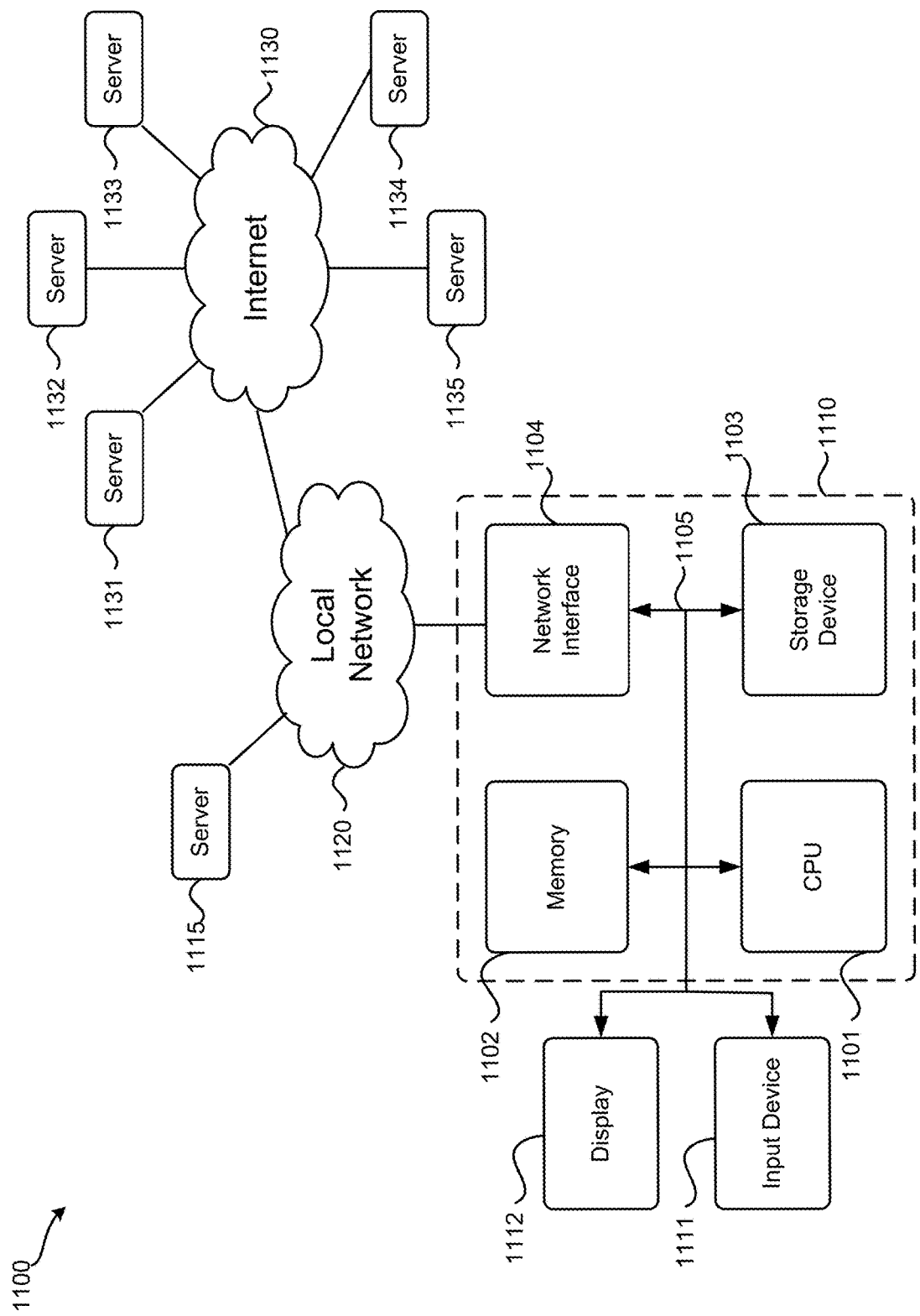

GRAPHIC REPRESENTATIONS OF PLANOGRAMS

BACKGROUND

Unless otherwise indicated herein, the approaches described in this section are not prior art to the claims in this application and are not admitted to be prior art by inclusion in this section.

The present disclosure relates generally to retail advertising and merchandising, and in particular to systems, methods, and devices for designing, generating, and distributing graphic representations of planograms. In many retail point-of-service or point-of-sale environments, the placement of merchandise, signage, advertisements, and other visual indicators are carefully planned. For instance, the location of specific placement of products on the shelf of a grocery store may be determined by agreement or contract with the distributor or manufacturer. Likewise, location, orientation and relative placement of retail advertisements and signage may be defined by regulations or contracts with various government agencies, suppliers, or advertising agencies. Because of the complexity and interrelated nature of the placement of merchandise and signage, it is typical for the parties of the various agreements to define the specifics of such displays in graphical form. One conventional graphical form used to define the specifics of the retail display is referred to herein as a "planogram". A typical planogram will include schematic representations and esoteric notations that are only useful to experienced retail workers and compliance representatives because they do not intuitively represent what the corresponding display should look like once it stocked according to the planogram.

SUMMARY

Embodiments of the present disclosure include systems, methods, and devices for generating and distributing graphic representations of planograms. One embodiment of the present disclosure is a computer implemented method that includes receiving a location identifier associated with a physical location from a client computing device, and retrieving a planogram associated with the location identifier. The planogram defines an arrangement of objects in the physical location. Such methods may also include generating a graphic representation of the planogram having images of the objects positioned relative to an image of the physical location, and transmitting the graphic representation of the planogram from the computer system to the client computing device, so that the client computing device may display the graphic representation of the planogram superimposed onto the image of the physical location captured by the client computing device.

In one embodiment, receiving the location identifier includes receiving the image of the physical location from the client computing device, and analyzing the image of the physical location to determine the location identifier.

In one embodiment, analyzing the image of the physical location includes locating a visual representation of the location identifier in the image of the physical location, and decoding the visual representation to generate the location identifier.

In one embodiment, generating the graphic representation of the planogram includes analyzing the image of the physical location to determine the section of the physical location captured in the image, and generating a section of the graphic representation of the planogram corresponding to the section of the physical location.

In one embodiment, analyzing the image of the physical location comprises analyzing sensor readings associated with image.

In one embodiment, retrieving the planogram comprises retrieving the images of the objects, and wherein generating the graphic representation of the planogram comprises adjusting the size of the images of the objects in response to the image.

In one embodiment, generating the graphic representation of the planogram includes comparing the image of the physical location to the graphic representation of the planogram to determine discrepancies between image of the physical location and the planogram, and generating visual indications of the discrepancies in the graphic representation of the planogram.

Another embodiment includes a non-transitory computer readable medium that includes instructions, that when executed by a computer processor, cause the computer processor to be configured for receiving a location identifier associated with a physical location from a client computing device, retrieving a planogram associated with the location identifier, wherein the planogram defines an arrangement of objects in the physical location, generating a graphic representation of the planogram, wherein the graphic representation of the planogram comprises images of objects positioned relative to an image of the physical location, and transmitting the graphic representation of the planogram to the client computing device, wherein the client computing device superimposes the graphic representation of the planogram onto the image of the physical location captured by the client computing device.

Yet another embodiment includes a system having a computer processor and a non-transitory computer readable medium coupled to the processor and comprising instructions, that when executed by the computer processor, cause the computer processor to be configured to receive a location identifier associated with a physical location from a client computing device, retrieve a planogram associated with the location identifier, wherein the planogram defines an arrangement of objects in the physical location, generate a graphic representation of the planogram, wherein the graphic representation of the planogram comprises images of objects positioned relative to an image of the physical location, and transmit the graphic representation of the planogram to the client computing device, wherein the client computing device superimposes the graphic representation of the planogram onto the image of the physical location captured by the client computing device.

The following detailed description and accompanying drawings provide a better understanding of the nature and advantages of the present invention.

BRIEF DESCRIPTION OF THE DRAWINGS

FIG. 11 is block diagram of computer systems that can be used to implement various embodiments of the present disclosure.

DETAILED DESCRIPTION

Figure 1A:
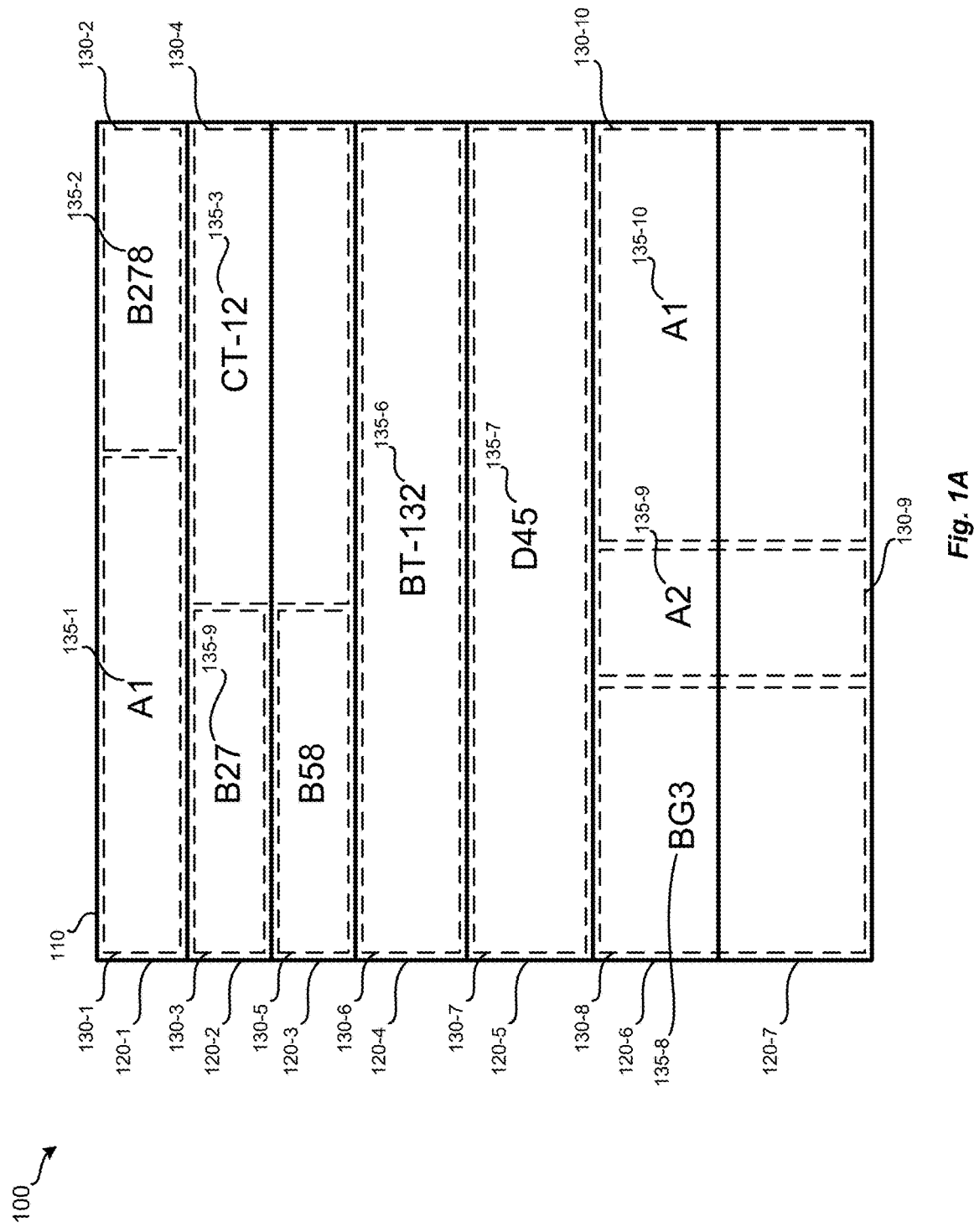
FIG. 1A illustrates a conventional planogram.

Embodiments of the present disclosure include systems and methods for presenting intuitive and easily understandable graphic representations of planograms using augmented reality imaging devices. Images of the objects specified in planograms defined in accordance with corresponding merchandizing and advertising agreements are superimposed in contextual images of locations with which the planograms are associated. In the following description, for purposes of explanation, numerous examples and specific details are set forth in order to provide a thorough understanding of the present invention. It will be evident, however, to one skilled in the art, that the present invention as defined by the claims may include some or all of the features in these examples alone or in combination with other features described below, and may further include modifications and equivalents of the features and concepts described herein.

Overview

Embodiments of the present disclosure include systems, devices, and methods for generating and distributing graphic representations of planograms that may be overlaid or superimposed onto captured images of real world physical locations (e.g., images of actual retail displays and advertising spaces). For example, images of objects (e.g., packaged products and indoor and outdoor advertising signs) in specific arrangements can be generated and sent to one or more client computing devices (e.g., tablet computers, smart phones, augmented reality classes, etc.) to visually indicate the proper arrangement and orientation of the corresponding objects in a particular physical location (e.g., store shelves, display cases, etc.). Such embodiments are useful in providing intuitive references or guides for stock persons and merchandisers when arranging products and signage in a particular location according to the requirements of various applicable merchandising and advertising agreements. As used herein, the term "physical location" refers to the actual real-world location, such a shelf, a display case, a rack, a billboard space, and the like, into which actual physical objects can be place, displayed or installed.

Other embodiments of the present disclosure include comparing images of a previously configured location (e.g., a partially stocked display case in which some of the items are missing or misplaced) with a graphic representation of an applicable planogram to check for compliance with the underlying agreement. In such embodiments, deviations of the condition of the actual arrangement of objects in the location from the applicable planogram may be visually indicated by images of ideally arranged objects superimposed over an image of the actual arrangement of the objects. For example, regions in which the products are improperly arranged or insufficiently stocked on a store shelf can be highlighted, or otherwise indicated, so the user can remediate or restock the shelf according to the planogram and/or the underlying contract or agreement. The graphic representations of the planograms, and the indications of non-compliance, can be statically superimposed over still images of locations and dynamically superimposed over live views of the locations.

Planograms

FIG. 1A depicts a conventional planogram 100 that references a particular display case 110 in a retail environment. As illustrated, the planogram 100 depicts a number of individual shelves 120 in the display case 100. The regions in which specific merchandise or signage is to be displayed is indicated by the display regions 130. As shown, the display regions 130 may incorporate complete shelves, such as display regions 130-6 and 130-7, as well as partial shelves or multiple shelves, such as display regions 130-2 and 130-10, respectively. In some conventional planograms, the specific merchandise or signage to be included in each one of the display regions 130 is defined by one or more display definition codes 135. For example, display definition code 135-1 may indicate that a specific brand of iced tea be displayed in the retail display region 130-1. The display definition code 135-1 may also indicate that all of the labels of the iced tea should be positioned in a particular direction (e.g., facing out towards the aisle).

While planograms, like planogram 100, are effective for describing the visual appearance of a particular retail display to an experienced merchandiser or sales representative, they are of little to no value to lay people who are inexperienced or unfamiliar with the convention and coding of the specific planogram 100. For instance, there are no visual indicators in the planogram 100 to describe to a typical retail user (i.e., a sales associate or stocker) which set of shelves in the retail environment corresponds to the display case 110 depicted in planogram 100. Furthermore, the retail user may not intuitively understand what the resulting display of products and displays should look like by just looking at the abstract, and somewhat esoteric, display definition codes 135 associated which each one of the display regions 130. As such, when it comes time to restock the shelves or to confirm compliance of a particular display with a predetermined merchandising or advertising agreement, a user must constantly refer to planogram 100, visually compare the positions, count the objects, and possibly refer to an external legend or key regarding the retail display codes 135. As such, the use of conventional planograms in the setup and maintenance of merchandise and signage in displays can be error-prone and labor-intensive.

Planogram Repository System

Figure 1B:
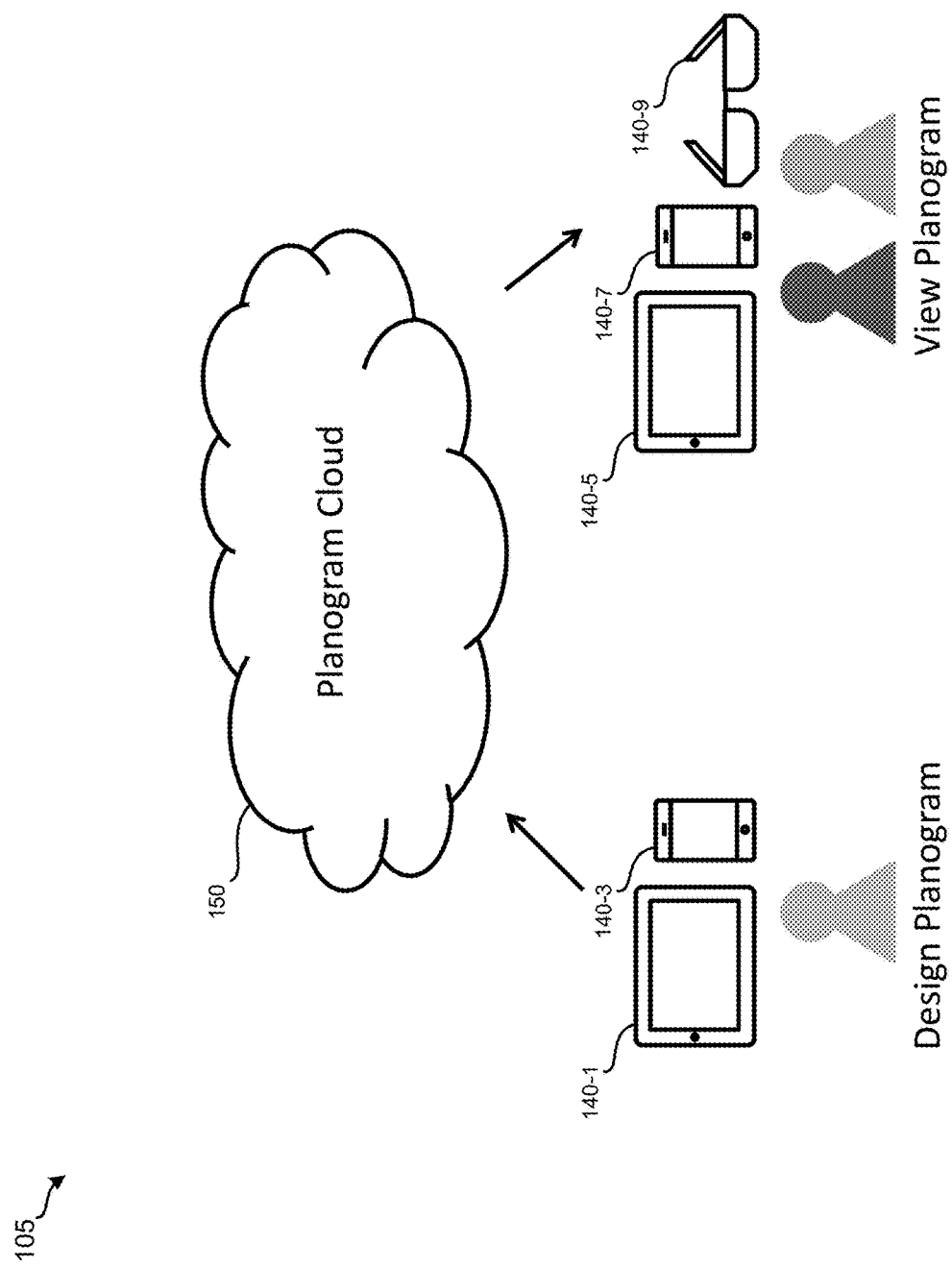
FIG. 1B depicts a system for generating and distributing graphic representations of planograms, according to various embodiments of the present disclosure.

FIG. 1B illustrates a general overview of the system 105 for designing, editing, and distributing graphic representations of planograms according to various embodiments of the present disclosure. In such embodiments, the planogram cloud 150 may include multiple computer systems (e.g., computer servers, business systems, etc.) implementing various functionalities in combinations of hardware, firmware, and software. For example, the planogram cloud 150 may include at least one computer system executing a planogram engine that includes functionality for designing planograms 100 and generating corresponding graphic representations of the planograms, according to merchandising and advertising agreements, and input received from client computing devices 140. As used herein, the term "graphic representation of a planogram" refers to a composite rendered image that may include images of a physical location (e.g., a picture of a display rack) and images of objects positioned relative to that image of the physical location (e.g., pictures or icons of the individual objects disposed in the display rack).

The client computing devices 140 may also be used to define a planogram using graphic representations (e.g., images or icons) of objects that are manually placed and arranged over an image of a particular location. For example, a client computing device 140, such as camera equipped tablet computer 140-1 or smart phone 140-3, may be used to capture an image of a particular location. The client computing device may display the image to the user in a graphical user interface that allows a user to select and arrange (e.g., drag-and-drop) various graphic representations of products and advertisements into the image to design the desired visual appearance of the location and then generate a corresponding conventional or proprietary schematic planogram.

During the design process, a user may iteratively alter or update the design of the arrangement of the images of the objects, and the corresponding planogram, in order to design the most effective advertising placement or visual appeal of the merchandise to increase the likelihood of sales. Various embodiments of the present disclosure allow the user to visualize the resulting display of merchandise and advertising in its actual location more easily and cost-effectively than using physical mock-ups. Once the designing user is satisfied with a particular arrangement, a resulting planogram can be generated and uploaded to the planogram cloud to be available to other embodiments of the present disclosure.

As used herein, the term "planogram" refers to the description of the arrangement of objects in physical location. Accordingly, the term "planogram data file" refers to any electronic file that includes a planogram and can be stored in volatile or nonvolatile computer readable memory and, as such, may include data for defining the specifications, quantities, layout, or arrangements of objects in a particular physical location. As used herein, the terms "planogram" and "planogram data file" refer to a schematic description that defines a specific arrangement or orientation of objects in a specific physical location and the electronic form of that description, respectively. In one embodiment, the arrangement of the objects may include absolute or relative positions or locations of the objects in a particular physical location. For example, the planogram may include descriptions of different types of canned fruit in a display case. The descriptions may include the orientation of the labels for each type of canned fruit (e.g., facing out), how many wide and tall the cans of each type of canned fruit should be stacked, and where in the display case the stacks should be located (e.g., canned peaches should be placed to the left of the canned pears that should be placed at the right most edge of the fourth shelf from the bottom).

A planogram data file may be uploaded to the planogram cloud 150 and distributed to and used by multiple consuming client computing devices, such as tablet computer 140-5, smartphone 140-7, or augmented-reality viewing devices, such as display glasses 140-9. In some embodiments, a planogram may include location data (e.g., coordinates or location identifiers), validity time periods, product identifiers, advertising identifiers, and the like. For example, a planogram may include the specifications for the arrangement of multiple products on a particular shelf in a particular store for some specific period of time. The arrangement of the products on the shelf may be associated with scalable images that can be used by the client computing device to overlay a graphical representation of the arrangement on top of a real-world and/or real-time image of the corresponding shelf. In one embodiment, the client computing device receives the planogram, the graphical representation of the arrangement, and/or the associated images and renders the graphical representation overlaid on the image of the physical location. In other embodiments, the planogram cloud 150 may render the graphic representation overlaid on the real-world and/or real-time image of the corresponding shelf received from the client computing device 140. In embodiments in which the planogram cloud 150 renders the complete graphical representations overlaid on top of the real-work images, the client computing device 140 does not, thus conserving computing resources and reducing power consumption.

In some embodiments, an image of the current conditions of the corresponding shelf can be compared with the graphic representation of the ideal arrangement of products and advertising according to the planogram. Using the comparison, various embodiments of the present disclosure provide visual alerts or indications of areas that need correction or restocking in order to comply with the underlying agreement of the planogram.

Figure 1C:
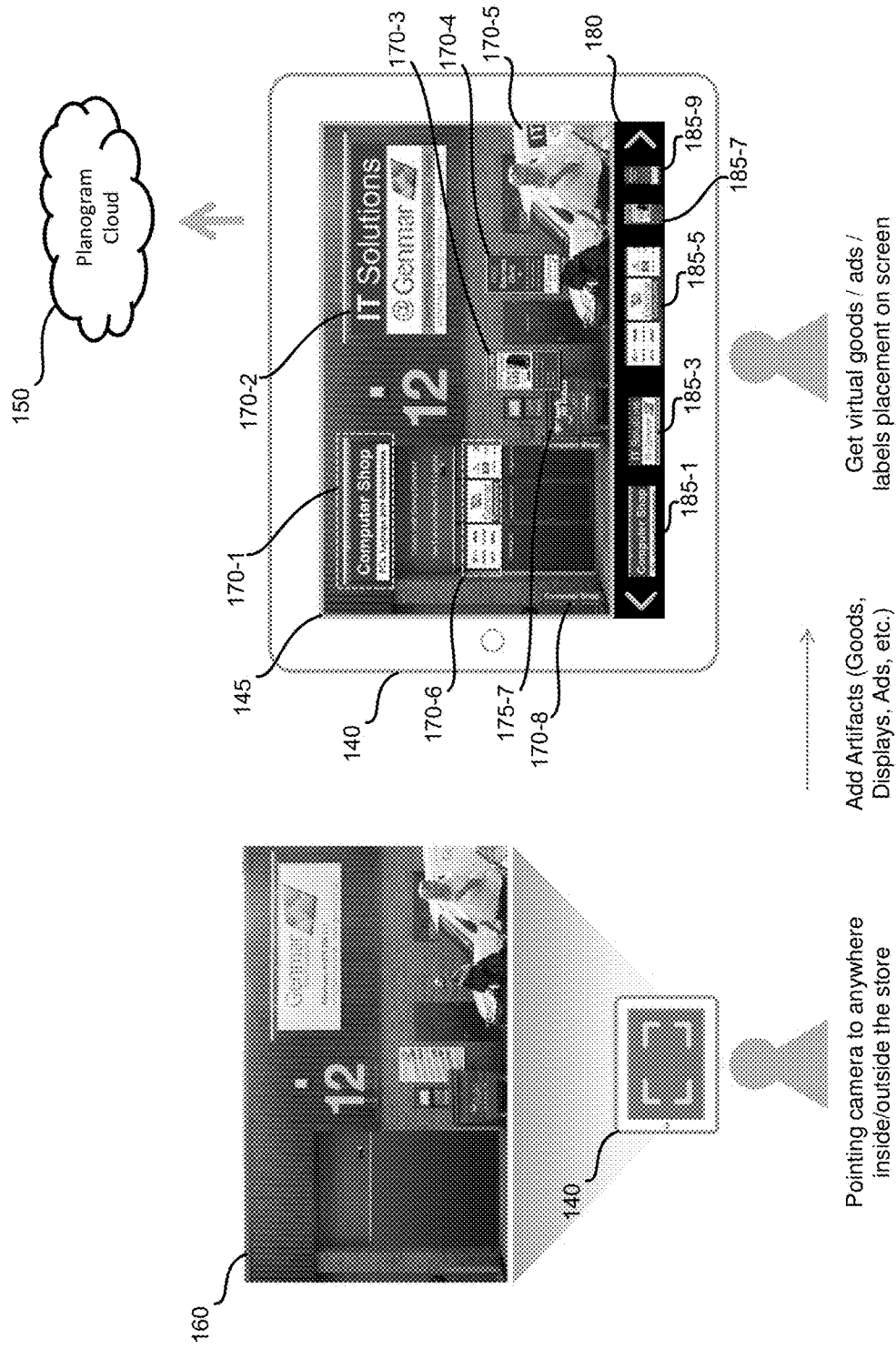
FIG. 1C illustrates a particular use case that uses a GUI for placement of objects in an image of a physical location to generate a corresponding planogram, according to various embodiments of the present disclosure.

FIG. 1C illustrates a particular use case for designing and visualizing a planogram for exterior advertising collateral. In such embodiments, a user can capture an image of an exterior scene 160 using the client computing device 140, such as a tablet computer. The client computing device 140 may include editing software for adding various graphic representations of objects, such as goods, displays, signs, and the like, to the image of scene 160. For example, the client computing device 140 may include a graphical user interface 145 with which a user may interact with controls and tools 180 to place graphical representations of various marketing collateral in the captured image of the exterior scene 160.

In the particular example shown, the user may select various types of signs 185 to be displayed in various locations of the image of scene 160. For example, the user may select any of the signs 185 by dragging-and-dropping the associated icon into the various locations 170 of scene 160 shown in the graphical user interface 145. The signs 185 when placed in a corresponding desired location 170 may be scaled according to the aesthetic goals of the designer or according to specific or general guidelines set forth in an underlying advertising contract or agreement.

In addition, the graphical user interface 145 may also include functionality for adding notations such as 175-1 to remove or rearrange existing objects in the scene 160. In the example shown, the user-added notation 175-1 indicates that the trash bin shown in the scene 160 should be removed.

Once the design is complete, the client computing device 140 can generate a corresponding planogram and upload the planogram to the planogram cloud 150. The resulting planogram may include standardized or proprietary definitions of the arrangements of the various objects in the planogram, as well as any image data (e.g. scalable image files, or references to retrievable image files).

Figure 2:
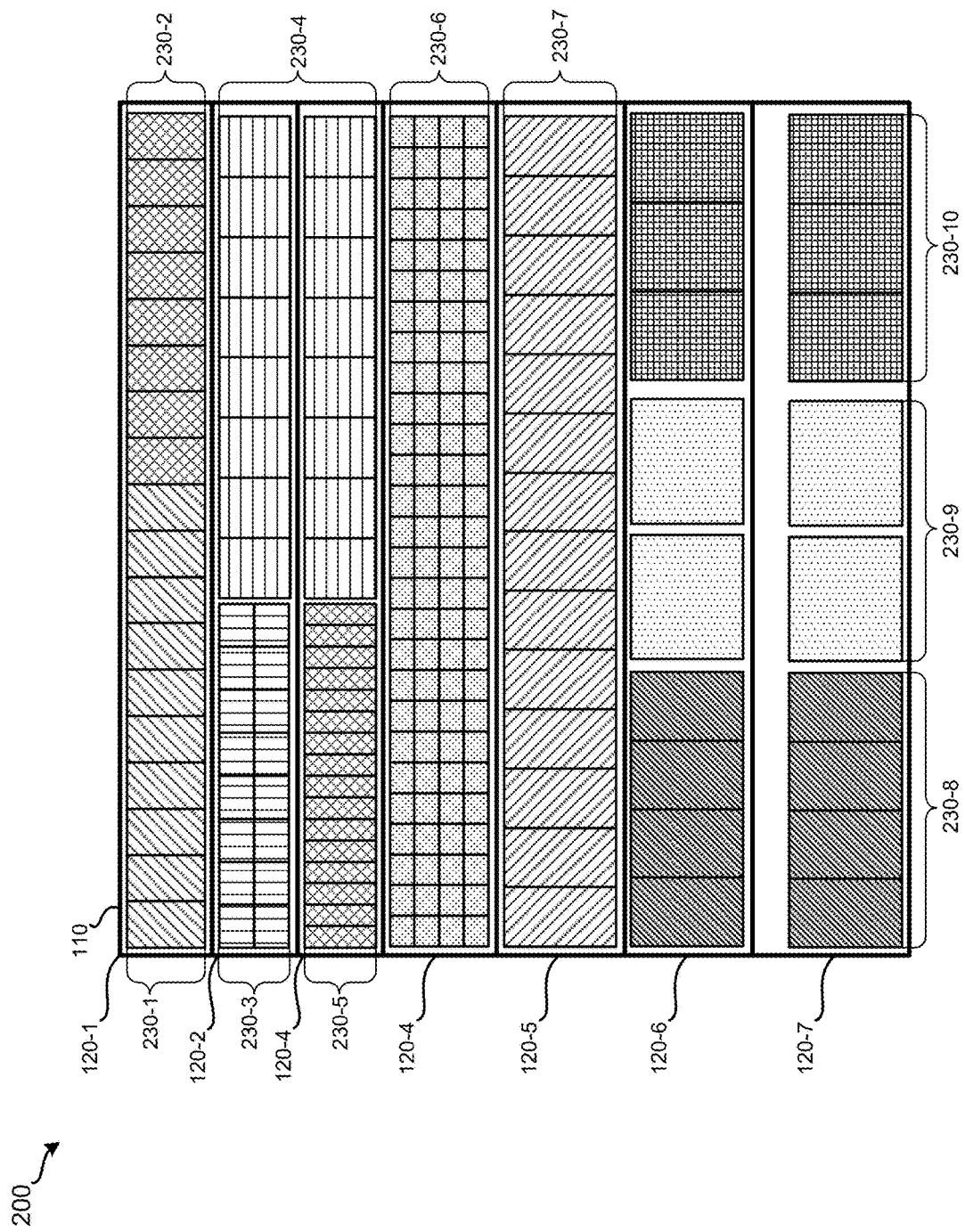
FIG. 2 depicts a graphic representation of a planogram generated by various embodiments of the present disclosure

FIG. 2 illustrates a graphic representation 200 of a planogram 100 that may be displayed on a user interface device 145 of a client computing device 140, according to various embodiments of the present disclosure. As shown, the graphic representation 200 may include a schematic or actual image of a physical location 110. In the particular example shown, physical location 110 includes a retail display shelf, however, it will be evident to one of ordinary skill in the art that the physical location 110 may include any other type of location. For example, the physical location 110 may include an aisle in a store, an outdoor billboard, a storefront, a display case, a point-of-sale countertop display, and the like.

The graphic representation 200, may represent specifications for the configuration of the display spaces in the physical location 110, such as shelves 120. While the configuration of the display space of physical location 110 shown in FIG. 2 is illustrated as a number of shelves 120, the display space may also include other display elements, such as racks, hangers, automated dispenser, bins, drawers, and the like. Accordingly, the specifications for the configuration of the physical location 110 may include specifications of the geometry of the display space. For example, the specifications of the geometry of the display space of physical location 110 may include the appearance, the number and the spacing of the shelves 120.

The graphic representation 200 of the planogram 100 may include images of objects 230 (e.g., pictures, drawings, icons, etc.) that are arranged relative to the configuration of physical location 110. The arrangement of the images of the objects 230 may also include the orientation of each object or group of objects. For example, the images of the objects 230 may include indications of the orientation of the objects on the shelves 120. In such embodiments, the image of the objects 230 may include depictions of the product packaging that indicate the preferred or required orientation of the objects on the shelves 120. The images of the objects may include rendering of the products that can be used to guide users when organizing, stocking, or replenishing the shelves 120 of the physical location 110. For example, the images of the objects 230 may include pictures of packaging that have inherent tops, bottoms, front, and backs, such that the corresponding physical objects can be placed on the shelves 120 in the correct orientation (e.g., products can be positioned on the shelves right-side up with labels facing out).

Figure 3A:
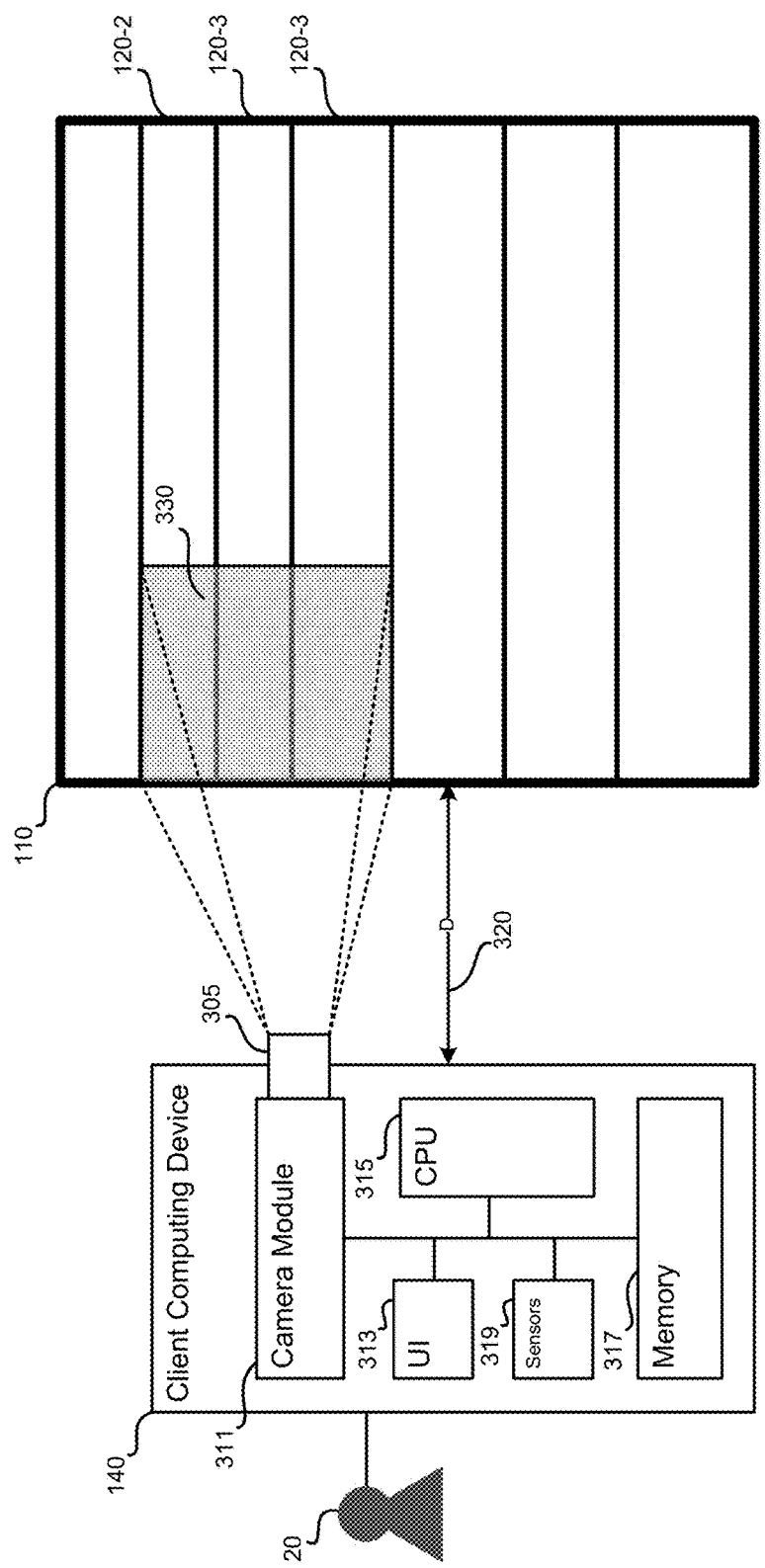
FIG. 3A is a schematic of a client computing device capturing an image of an empty display case physical location, according to various embodiments of the present disclosure.

FIG. 3A is a schematic of the client computing device 140 and a representation of it capturing an image of physical location 110. As shown, the user 20 can operate the client computing device 140 to capture an image of a section 330 of the location 110 within the field of view of the lens 305 of the camera module 311. To capture the image, user 20 may use the user interface device 313 to initiate the execution of software stored in the memory 317 on CPU 315 to operate the camera module 311. Because the imaged section 330 may include less than a complete image of the physical location 110, the client computing device 140 may need to determine what section of the applicable planogram should be referenced for generating the corresponding section of the graphic representation 200. Various embodiments of the present disclosure may determine the applicable section of the planogram by first determining where the specific imaged section 330 is located within the physical location 110.

In one embodiment, the geographic location of a physical location 110, such as store, address, aisle number, or billboard, may be determined using a location identifier associated with the physical location 110. As used herein, the term "location identifier" may include a numeric, alphanumeric, hexadecimal, or other string, associated with a corresponding location that can be used to reference or retrieve applicable merchandizing agreements, location configurations, and/or planograms. Based on the location identifier, and other contextual details, the corresponding complete planogram 100 may be identified. Once the complete planogram 100 is identified, various embodiments include techniques for determining the section of the planogram that corresponds to the imaged section 330. In one embodiment, various contextual details associated with the physical location 110, such as its relative geometry relative to client computing device 140, can be used to determine the imaged section 330. To determine such contextual details, the client computing device 140 and the physical location may include various components and features.

Determining Contextual Details

In various embodiments, the client computing device 140 may include one or more sensors 319. Sensors 319 may include various devices for sensing or determining the physical location, orientation, movement, or other conditions and configurations of the client computing device 140 relative to a particular physical location. For example, sensors 319 may include an accelerometer, a gyroscope, a compass, an altimeter, a global positioning system (GPS) receiver, a magnetometer, a near field communication (NFC) transceiver, an optical sensor, an infrared rangefinder, and the like. Accordingly, when the client computing device 140 operates the camera module 311 to capture an image of some section 330 of the physical location 110 within the field of view of the lens 305, the readings from sensors 319 can also be recorded, included in, or associated with the image. For example, when the client computing device 140 is operated so that the camera module 311 captures an image of the physical location 110, one or more of the sensors 319 may be operated to determine the distance D 320 between the physical location 110 and the client computing device 140. In one embodiment, sensors 319 may include an infrared range finder that can record the distance D 320. In other embodiments, the sensors 319 may include an NFC or GPS receiver that can be used to triangulate the position of the client computing device 140 relative to the physical location 110.

The distance D 320, and other geometry of the scenario, may then be used in combination with the specifications of the lens 305 (e.g., focal length, field of view, magnification, etc.), to determine the section of the physical location 110 included in the imaged region 330. Based on the determined section of the physical location 110 in imaged region 330, the client computing device 140 can request the corresponding planogram and/or graphic representation of the planogram, or portions thereof, for that section.

In other embodiments, sensors 319 may include an accelerometer or a gyroscope to determine the rotation, tilt, and/or yaw of the client computing device 140 relative to the physical location 110. Using the relative orientation of the client computing device 140 and information about the physical location 110, the client computing device can determine which section of the corresponding planogram 100 to reference to generate the applicable graphic representation 200 of the section 330. In addition, the relative orientation of the client computing device 140 relative to the physical location 110 can be used by the client computing device 140 or the planogram cloud 150 to augment the graphic representation 200 of the planogram to match the image of the physical location 110 or section 330. For example, when the client computing device 140 is tilted, the resulting image can be distorted or skewed, such that the shelves 120 in the top of the image may appear larger or smaller than the shelves in the bottom of the image. Using the known tilt of the client computing device 140, or other sensor readings, the graphic representation of the corresponding planogram and/or the component images of the objects can be adjusted to match the size and/or distortion of the image of the physical location 110. For example, the images of the objects in the graphic representation 200 of the planogram can be skewed, stretched, or shrunk to fit in the images of the shelves 120, thus presenting a realistic superimposed image of the planogram onto the real world image of the physical location 110.

Figure 3B:
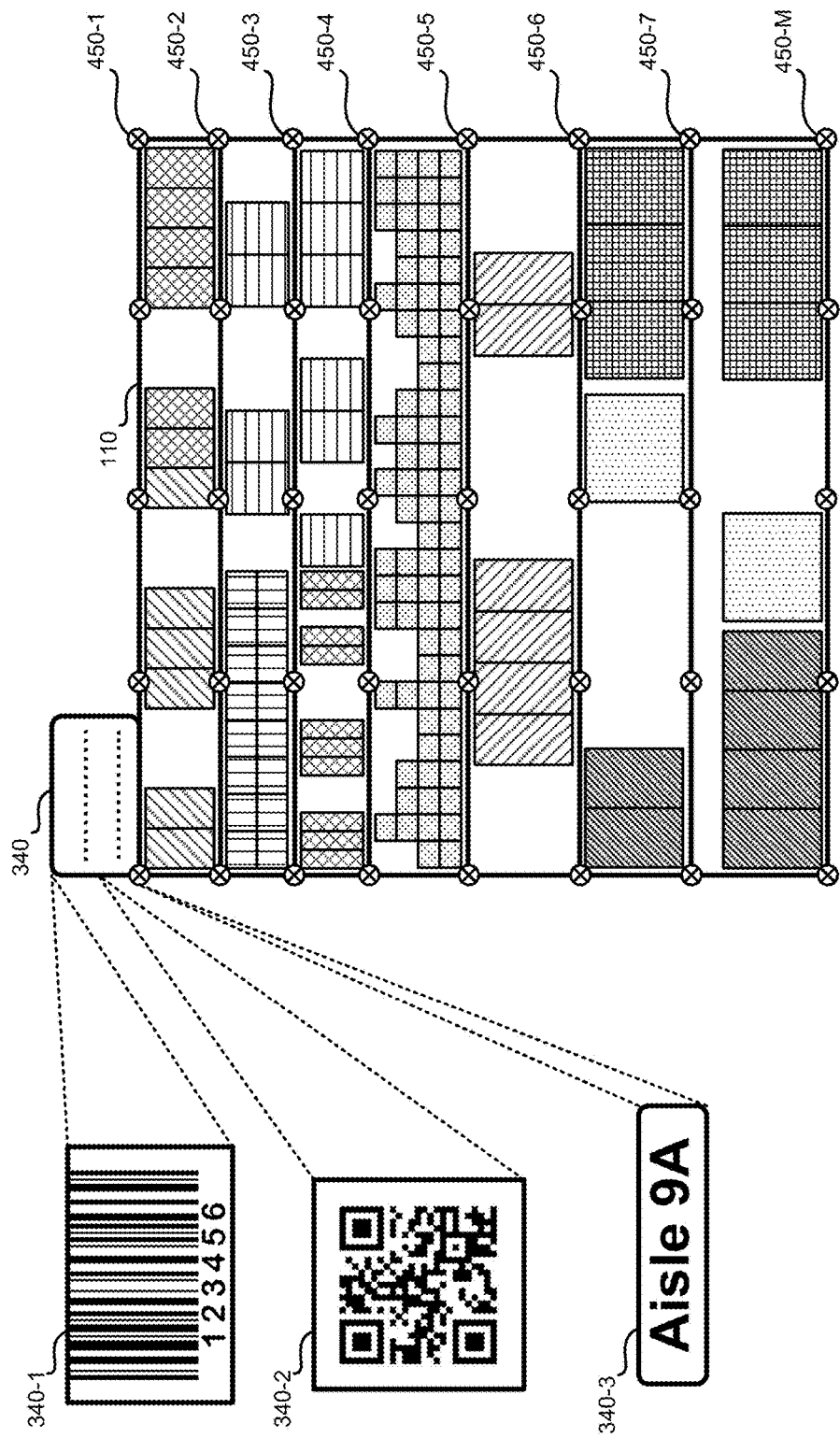
FIG. 3B depicts examples of devices for determining location identifiers and relative orientation between the client computing device and a physical location, according to various embodiments of the present disclosure.

In other embodiments, the physical location 110 may include location markers 450, depicted in FIG. 3B, for determining which section 330 of the physical location 110 is captured in a particular image. For example, the markers 450 may be arranged in a grid on the shelves 120 of the display case of physical location 110. The markers 450 may each include or be associated with a unique identifier that can be used as a coordinate system that maps the various regions of the physical location 110 to the corresponding sections of one or more planograms. In some embodiments, arrangement of the location markers 450 may include a simple rectilinear grid pattern, as shown in FIG. 3B, however, any type of coordinate system can be used to map the physical location 110.

The location markers 450 can indicate their associated unique identifier in various ways. In one embodiment, each marker may include a visual representation of the unique identifier that is detectable by the client computing device 140. Such visual indicators can include markings or reflective elements detectable in the visible region of the electromagnetic spectrum, as well as markings that are detectable in the infrared and ultraviolet regions. The client computing 140 may then detect the visual indicators by processing the captured image of the section 330 to determine which section 330 of physical location is being imaged.

In another embodiment, the markers 450 may emit NFC, or other radio frequency, beacon signals detectable by the client computing device 140. Similarly, the markers 450 may emit optical or sonic beacon signals detectable by the client computing device 140 to indicate their position or unique identifier. In such embodiments, the client computing device may use the signals from the location markers 450 to determine which section of the physical location 110 is captured in the imaged section 330.

Also depicted in FIG. 3B, are example visual representations of the location identifier 340. As shown, the location identifier 340 can be disposed on or near the physical location 110. In an embodiment, the location identifier 340 is depicted as sign using alphanumeric text, like example location identifier 340-3, that a user can read and manually enter into the client computing device 140. Alternatively, visual representations of the location identifier 340 may include machine readable code, such as barcode location identifier 340-1 and QR code location identifier 340-2. In embodiments that use machine readable code as the visual representations of the location identifier 340, the client computing device 140 may include a scanner or camera for reading the code and logic for decoding the machine readable code to determine the location identifier.

Compliance Checking

Figure 4:
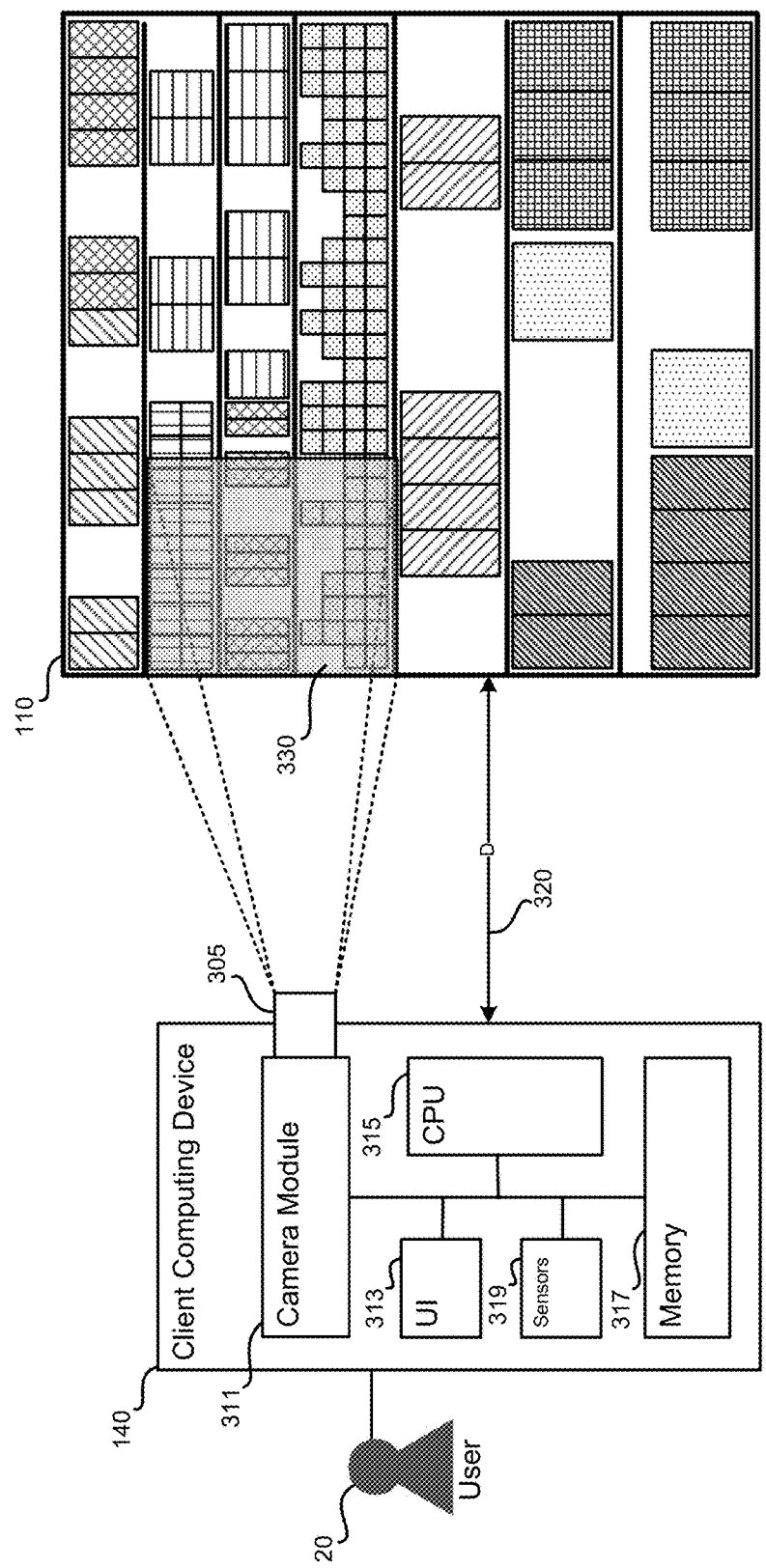
FIG. 4 is a schematic of a client computing device capturing an image of a particular partially populated display case, according to various embodiments of the present disclosure.

The example of physical location 110 in FIG. 3A is represented as an empty display case. Such a scenario corresponds to a situation in which the shelves of the display case start empty and are ready to be stocked. However, such a specific scenario may be less common that the situation in which the starting point is a partially stocked or depleted display case. For example, the display case of location 110 shown in FIG. 4 may be partially depleted as the result of products being removed from the shelves during the normal course of business. In such a scenario, the shelves may only be populated partially according to an underlying merchandising agreement or contract.

As used herein, the terms "merchandising agreement" refers to an underlying business arrangement that defines the specific objects and their placement in a specific location. Accordingly, a merchandizing agreement may include requirements for product placement, sign placement, and the times and locations for which the requirements are applicable. For example, in some embodiments, a merchandising agreement may include a temporal element that defines the period for which the required arrangement is applicable. Accordingly, a merchandising agreement may be seasonal, such that the placement of objects in a given location may be subject to change according to the time or date. For example, the merchandising agreement for a particular location may be subject to change according to the holiday seasons. The particular objects and the arrangement of the objects in the location may be customized to present certain holiday specific products during the holiday season, and may be changed to present other products during the summer season.

To assist in restocking the location 110 or to check compliance with the applicable merchandizing agreement, the client computing device can image the location 110, or some the portion 330, and request the corresponding planogram and/or the corresponding graphic representation of the planogram. The client computing device 140 can then receive the planogram or the graphic representation of the planogram. In embodiments in which the client computing device 140 receives the actual planogram, the client computing device may generate the graphic representation using locally or remotely stored images that represent the objects defined in the planogram. The client computing device can then superimpose the graphic representation of the planogram over a real world or live view of the location 110 to show where specific objects should be arranged. In a live view, similar to that in a video viewfinder, the graphic representation of the planogram superimposed over the location 110 can track the changes in the scene as the user pans and tilts the client computing device 140 to scan various sections of the location 110 based on readings from sensors 319. Thus, as the portion 330 of the location 110 displayed in the viewfinder or display of the client computing device 140 changes, so does the superimposed graphic representation of the planogram. In an embodiment, readings from the sensors 319 can be associated with, attached to, or embedded in the still image or image stream, such that the portion of the physical location captured in the image may be determined. Accordingly, the graphic representations of the applicable planogram can be automatically updated as the camera module 311 scans one or more particular physical locations 110. As the image of the physical location changes, the portion of the applicable planogram(s) can also be updated and moved in concert with the changes in the image. For example, as the camera module 311 scans from a shelf of the physical location 110 that includes boxes of cereal to another shelf that includes boxes of pasta, the graphic representation of the planogram can be change automatically from showing images of the cereal boxes to images of pasta boxes in the appropriate placements on the shelves.

The superimposed graphic representation of the planogram may include super imposed images of the objects 230 arranged in the positions (i.e., the shelves) within the location 110 where they should be stocked. In some embodiments, the super imposed graphic representation can include indications of noncompliance where the arrangement of the existing objects in the location 110 are not compliant with the associated planogram. In addition, such indications of noncompliance may also include indications as to where the existing objects should be moved, rearrange, or replenished in location 110. All such indications can include graphic representations of each object (i.e., images of products and signs) having differentiating outlines, highlights, blinking elements, arrows, and the like, to indicate which and how objects should be altered to bring the location 110 into compliance with the applicable planogram. For example, if some products on the shelf are facing the wrong direction, the graphic representation of those products superimposed over the image of the actual products may include an arrow to indicate how the product should be reoriented on the shelf (e.g., point to the direction in which the product should be rotated such that the label is facing outward). In other embodiments, the indications of non-compliance may include a flashing overlaid fill pattern with accompanying alphanumeric instructions as to how to remedy the discrepancy. The indications of non-compliance may include displaying a count of the number of objects that are missing from the image of location. For example, if a section of soup cans should include 20 cans of soup and the image of the location only includes 15 cans of soup, then the indication of non-compliance may include a notation that 5 cans of soup are missing.

Planogram Engine System

Figure 5:
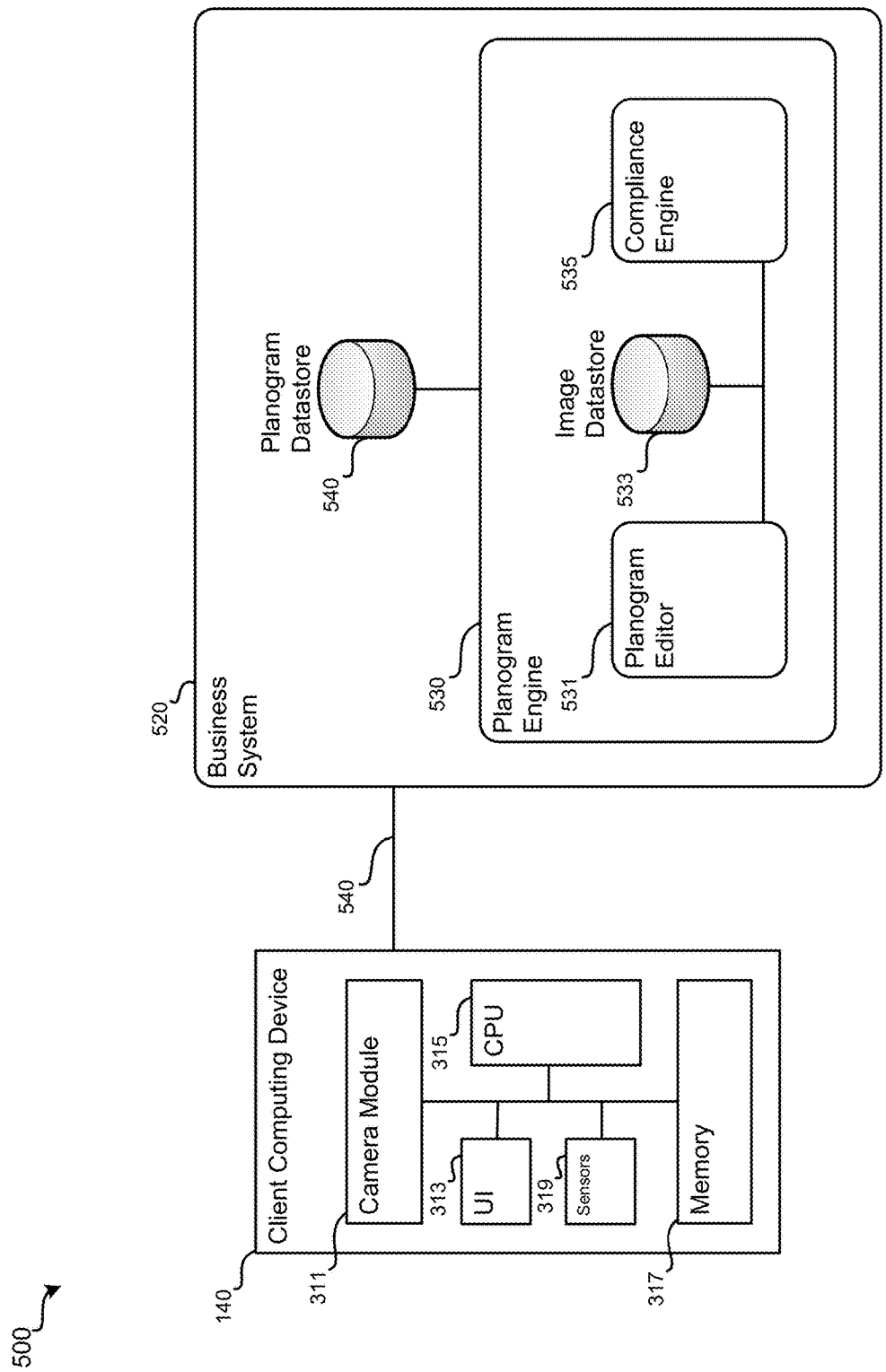
FIG. 5 is schematic of a system for generating and distributing planograms according to various embodiments of the present disclosure.

FIG. 5 illustrates a system 500 for generating, distributing, and using graphic representations of planograms according to various embodiments of the present disclosure. As shown, the system 500 includes a business system 520, such as an enterprise resource planning (ERP) system, customer relationship management (CRM) systems, and the like. The business system 520 may include any number of individual or networked computing systems executing one or more software applications that provide various business data and business analysis functionality. Accordingly, the business system 520 may include a central server computer or a number of virtual or physical computer systems in a cloud computing configuration. In various embodiments of the present disclosure, the business system 520 may include a planogram engine 530 coupled to a planogram data store 540. As shown, the planogram engine 530 may include a planogram editor 531, an image data store 533, and a compliance engine 535.

System 500 may also include one or more client computing devices 310 executing a client application for communicating with the business system 520 and the planogram engine 530 over communication connection 540. In one embodiment, the client application is manually invoked on the client computing device 310 by a user, while in other embodiments the client application may run in the background to monitor any images that the camera module 311 captures. In either of such embodiments, the client application may handle the client computing device 140 end of the image capture, location determination, image processing, and image rendering processes.

In some embodiments, the communication connection 540 may include various types of electronic communication protocols and media. For example, the communication connection 540 may include an IEEE 802.11x or "WiFi" wireless networking protocol, a worldwide interoperability for microwave access (WiMAX) networking protocol, or a cellular-based networking protocol, such as general packet radio service (GPRS) using 2G, 3G, 4G, 4G LTE, and other global system for mobile communications (GSM) packet-based cellular data technologies.

The client computing device 140, as previously described, may include one or more camera modules 311 coupled to central processing unit (CPU) 315, user interface 313, sensors 319, and memory 317. The CPU 315 may execute computer executable instructions (e.g., software) stored in the memory 317 to control and operate the camera module 311, the UI 313, and/or the sensors 319, according to various embodiments of the present disclosure. The user may operate the client computing device 140 to execute client software stored in memory 317 to capture an image of a particular location 110 and to communicate with the planogram engine 530.

Planogram Engine: Design Time

As illustrated in FIG. 5, the planogram engine 530 may include functionality for a planogram editor 531. In some embodiments, the planogram editor 531 may include functionality for both generating new planograms and editing or updating existing planograms. Generating new and editing existing planograms may include selecting objects, defining or reconfiguring physical locations, and the defining the relative arrangement of objects within the framework of the physical locations.

To provide the a user of a client computing device 140 the tools to generate new or edit existing planograms, the planogram editor 531 may include a connection for interfacing with the UI 313 in the client computing device 140. In some embodiments, the connection for interfacing with UI 313 may include sending or receiving Adobe Flash™, Oracle Java™, or other such thin client executable code that provides a graphical user interface (GUI) that allows a user to add and arrange visual representations of various objects to the image of a physical location. In other embodiments, the planogram editor 531 may service the client computing device 140 using one or more web communication protocols and languages, such as hypertext transfer protocol (HTTP) and hypertext markup language (HTML). In such embodiments, the user interface 313 may receive information from the planogram editor 531 that provides a user with a GUI that includes controls for capturing an image of a physical location 110 using the camera module 311 of the client computing device 140. The GUI may include a menu of images of specific objects. The GUI may allow the user to place one or more copies of images into the scene. For example, the user may drag-and-drop and scale images of signs or products into an image of specific shelves or racks in an aisle of a grocery store to simulate how the actual objects will look when placed in the aisle. The placement of the images of the objects may be free-form and left to the discretion of the designing user. Alternatively, the placement of the objects may be based on an applicable merchandizing agreement.

The resulting edited scene may describe the arrangement of the images of the objects relative to one another and the image of the physical location. The resulting edited scene may then be saved as a scene file. The scene file may include embedded images of the objects or links to the images of the objects stored in the image data store 533, as well as one or more location identifiers associated with the imaged physical location.

Each embedded object image or link to an object image may be associated with an object identifier. The object identifier may include or refer to a description of the object. For example, the object identifier may include the stock keeping unit (SKU) number, or other unique number or string, associated with the specific make, model, brand, type, color, size, or other specifications regarding the dimensions, weight, and appearance of a product.

The location identifier can be used to retrieve the specific geometry of the physical location. With reference to the example of an aisle in a grocery store, the location identifier may include the designation of a particular display case number and a particular aisle number imaged in the scene file. The location identifier can be used to retrieve the specific geometry of the aisle and the retail displays in that aisle. For instance, the geometry of the aisle may include distances between display cases, and the specifications and dimensions of the racks or shelves within each display case.

The scene file may then be sent to the planogram engine 530. The scene file may include various standardized and propriety file formats including, but not limited to, JPEG, TIFF, PNG, PDF, and the like.

The scene file may then be sent to the planogram engine 530. The scene file may include various standardized and propriety file formats including, but not limited to, JPEG, TIFF, PNG, PDF, and the like. The planogram editor 531 may process the scene file to generate a new or updated planogram.

Processing the scene file may include analyzing the relative arrangement of the images of the objects and physical location, retrieving the specifications of the physical location and the objects based on the location and object identifiers, and generating a resulting planogram based on the specifications. Generating the planogram may include analyzing the specifications of the physical location and the objects in view of the relative arrangement of the images to determine the arrangement of the objects in the physical location in reference to a coordinate system defined in the specifications of the physical location. Accordingly, the resulting planogram may describe the placement and orientation of objects in the physical location independent of the image of the physical location in the image file. The resulting planogram may be saved as a planogram data file in the planogram data store 540 and associated with one or more physical location identifiers.

In one embodiment, processing the scene file may also include determining or associating the resulting planogram with a particular time period, such as a date range. As such, the resulting planogram may be saved as planogram data file in the planogram data store 540 and associated with one or more time/date ranges.

The particular date range may be defined by an applicable merchandizing agreement that describes a lowered-price promotion for a specific set of products that are to be displayed. Again, in reference to the aisle of shelves in a grocery store example, the time period may include a defined data range during which a limited time buy-one-get-one-free offer for some set of food items displayed in the aisle is valid, or the date range during which certain seasonal/holiday food will be on-sale and, therefore, purposely displayed in more prominent parts of a particular display case. For instance, shelves that are at adult eye-level or display cases at the end of an aisle may be considered more prominent, and therefore may be considered a more desirable location in which to display sale items. Accordingly, when the client computing device 140 requests a planogram, or graphic representation of a planogram, for a particular location during the sale period, the request may also be associated with a time stamp, such that the currently applicable planogram for that particular location during the sale may be retrieved.

In various embodiments, the planogram engine 530 may retrieve a previously stored planogram data file from the planogram data store 540. Retrieval of the planogram data file may be responsive to requests for a specific planogram data file received from the client computing device 140. In such embodiments, the request for a specific planogram data file may include an associated location identifier and/or a timestamp or time identifier.

The planogram editor 531 may change, edit, or generate a new or augmented planogram data file based on user input. In some embodiments, editing the planogram data file may include generating a graphic representation of the planogram based on the specifications of the physical location and objects included or referenced in the planogram data file. The graphic representation may then be displayed in a GUI on client computing device 140. Accordingly, editing the planogram data file may include receiving user input to delete, move, or add images of objects within the framework of a graphic representation or image of the physical location. In one embodiment, a user may add, delete, and arrange the objects in a planogram by dragging-and-dropping images of the objects 230 relative to the image of the physical location 110 in the graphic representation of the planogram displayed in a GUI 145 on a client computing device 140. For example, a user may drag-and-drop pictures of boxed cake mix to rearrange the them on the shelf so that all of the pictures of the different brands of chocolate cake mix are next to one another on a picture of one shelf, and all of the pictures of the different brands of angel food cake mix are next to one another on a picture of another shelf.

Adding images of objects may include retrieving the associated images from the image data store 533 for a particular object to be added to the planogram. For instance, the image data store 533 may store scalable pictures of the packaged food items that are stocked by a particular grocery store. The planogram editor 531 may display selectable representations of some or all of the available pictures of the packaged food items from the image data store 533 in a GUI. To add a particular packaged food items to the arrangement of the planogram, the planogram editor 531 may include tools in the GUI for dragging-and-dropping a picture of the front of the food item's package onto an image of a shelf in the display case associated with the planogram. In some scenarios, it may first be necessary to remove images of objects from the graphic representation of the planogram before new images of objects can be added. Accordingly, the planogram editor 531 may include tools in the GUI with which a user may remove pictures of one or more products from the graphic representation of the planogram. For example, the GUI may include a "trash can" icon into which the pictures of the products to be removed from the planogram can be dragged-and-dropped.

In the same GUI, the planogram editor 531 may also include tools for rearranging existing pictures of the packaged food item. For example, the images of the packaged food items can moved to another shelf or stacked on top of one another. Any of such changes in the pictures of the packaged food items relative to the shelves of the display case may cause a change in the appearance of the graphical representation of the planogram. The resulting change in the graphical representation of the planogram may then be analyzed to update the underlying planogram. The resulting updated planogram may then be saved as new or updated planogram file in the planogram data store 540.

In other embodiments, editing the planogram may include changing the specifications or arrangement of the physical location. For example, the number or spacing of shelves a particular display case may be altered to accommodate larger or smaller objects. In such embodiments, the designer of a particular location may see an actual representation of how the location will look with a particular configuration or arrangement of objects in the modified location. If the designer is not happy with the arrangement or would like to experiment with other configurations, then all the designer need to do is rearrange the images of the objects or reconfigure the image of the physical location. The generation of the resulting planogram is automatic and much faster than completing a physical mock of the design.

The scaling and perspective of the images of the objects within a particular graphic representation of a planogram can be altered to match the perspective of the image of the location automatically. As such, objects that are placed farther in the background of the image of the location may be automatically decreased in size to achieve a matching perspective. Similarly, objects are placed farther in the foreground of the image of the location can be made larger for to provide for consistent representation of perspective. Other distortions are possible in order to make the most realistic representation of the objects placement in the location.

Planogram Engine: Compliance Checking

In addition to providing an easily understood and intuitive interface for designing planograms in the planogram editor 531, the planogram engine 530 may also include a compliance engine 535 for checking the compliance of a particular location with a specific planogram and its underlying merchandising agreement. In such embodiments, the planogram engine 530 may receive a request for compliance check from the client computing device 140. The request for a compliance check may include a location identifier (e.g., aisle and shelf numbers) and/or an image or a live feed of the physical location and its current conditions (e.g., an image of the partially stocked items on a particular shelf). The image of the physical location and the current conditions may be compared and contrasted with an applicable planogram. Any discrepancies between the image of the physical location and the applicable planogram (e.g., missing or depleted supplies of one or more items on the shelf) can be flagged or otherwise visually indicated to be corrected (e.g., arrows indicating where and what items need to be added to the shelf).

In one embodiment, the location identifier may include alphanumeric text manually entered by a user of the client computing device 140. For example, a user may manually enter a store identifier, an aisle identifier, and/or a shelf identifier using a keyboard or keypad provided in the user interface 313. This manual process may include the user reading an alphanumeric designation for the shelf included on the physical location itself or from a map of a retail location.

In some embodiments, the location identifier may be embedded in the image or live feed of the physical location. For example, a visual representation of the location identifier printed on or near a display case may be included in an image of the physical location captured by the client computing device 140. In such embodiments, the visual representation of the location identifier may include a label or sign with alphanumeric text or machine-readable code, such as barcodes, QR codes, machine-readable numbers, or the like.

For visual representations of the location identifiers embedded in the image, the planogram engine 530, or the compliance engine 535, may locate and decode the visual representation to determine a specific location identifier. For example, the visual representation of a display case may include image of an aisle number, shelf number, department number, display case number, or some combination thereof, written out in alpha numeric text. The compliance engine may detect the text and perform an optical character recognition (OCR) function on it to determine the location identifier.

In other embodiments, the client computing device 140 may include a radio frequency identification (RFID) sensor as one of the sensors 319. In such embodiments, the client computing device 140 may detect the location identifier from an RFID tag at or near the physical location when capturing images and/or sending the compliance check request to the compliance engine 535.

In response to the compliance check request and/or the location identifier, the compliance engine 535 may retrieve a corresponding planogram file from the planogram data store 540. The compliance engine 535 can then generate a graphic representation of the planogram based on the corresponding planogram in the planogram file. The graphic representation may include a static image that may be sent to the client computing device 140 that can be superimposed over an image of the location captured by the client computing device 140. In such embodiments, the client computing device 140 may perform the comparison between the image of the physical location and the graphic representation of the planogram to determine discrepancies. The client computing device may then generate indications of where the image of the physical location differs from the planogram. Such indications can include superimposing visual indications, such a flashing outlines and colored highlights, of the discrepancies over the image of the physical location.

In other embodiments, the compliance engine 535 may generate a complete compliance check image that may include both the image of the physical location captured by the client computing device 140, the graphic representation of the planogram, and visual indications of where they differ. The complete compliance check image can then be sent back to the client computing device 140 to be referenced by the end user.

In a related embodiment, the compliance engine 535 may continuously or intermittently receive and monitor a live feed of the physical location received from the client computing device 140. Based on a continuous or intermittent determination of the section of the physical location captured in the feed, the compliance engine may continuously or intermittently generate a corresponding stream of corresponding graphic representation of the planogram to send to the client computing device 140. In such embodiments, the client computing device may then compare the continuous or intermittent images of the physical location captured by the client computing device with the corresponding continuous or intermittent graphic representations of the planogram to determine discrepancies as the client computing device scans over the physical location.

In one example implementation, the compliance engine 535 may retrieve images of the objects specified in the planogram, including images of the physical location, to generate a realistic depiction of what the location should look like according to the planogram. The depiction of the location according to the corresponding planogram may then be continuously or intermittently sent to the client computing device 140. The depiction of the location may be updated in response to movement data (i.e., changes in the relative position of the client computing device 140 as it scans the location) to update the depiction of the location. Accordingly, the UI 313 may include a camera viewfinder mode that shows a graphic representations of the planograms (e.g., rendered pictures of items on the shelf) superimposed over a live view of the physical location with highlighted regions to point where the condition of physical location does not comply with the associated planogram (e.g., where items on the shelf are missing or need to be moved).

In embodiments in which the compliance engine 535 compares the image of the physical location captured by client computing device 140 with the graphic representation of the planogram to determine areas of noncompliance, the comparison of the image of the location and the graphic representation of the planogram may be performed in a number ways. In one example implementation, the comparison of the image of the physical location and the graphic representation of the planogram may on a pixel-by-pixel basis. Alternatively, the comparison can be performed over a variable number of regions in the image of the location. In such embodiments, the compliance engine 535 may compare integrated color or shade values over corresponding regions in the image of the location and the graphic representation of the planogram. Differences between the image of the location and the graphic representation of the planogram may be determined to be a region of noncompliance and indicated in the graphic representation of the planogram as such.

Example Use Cases

Figure 6:
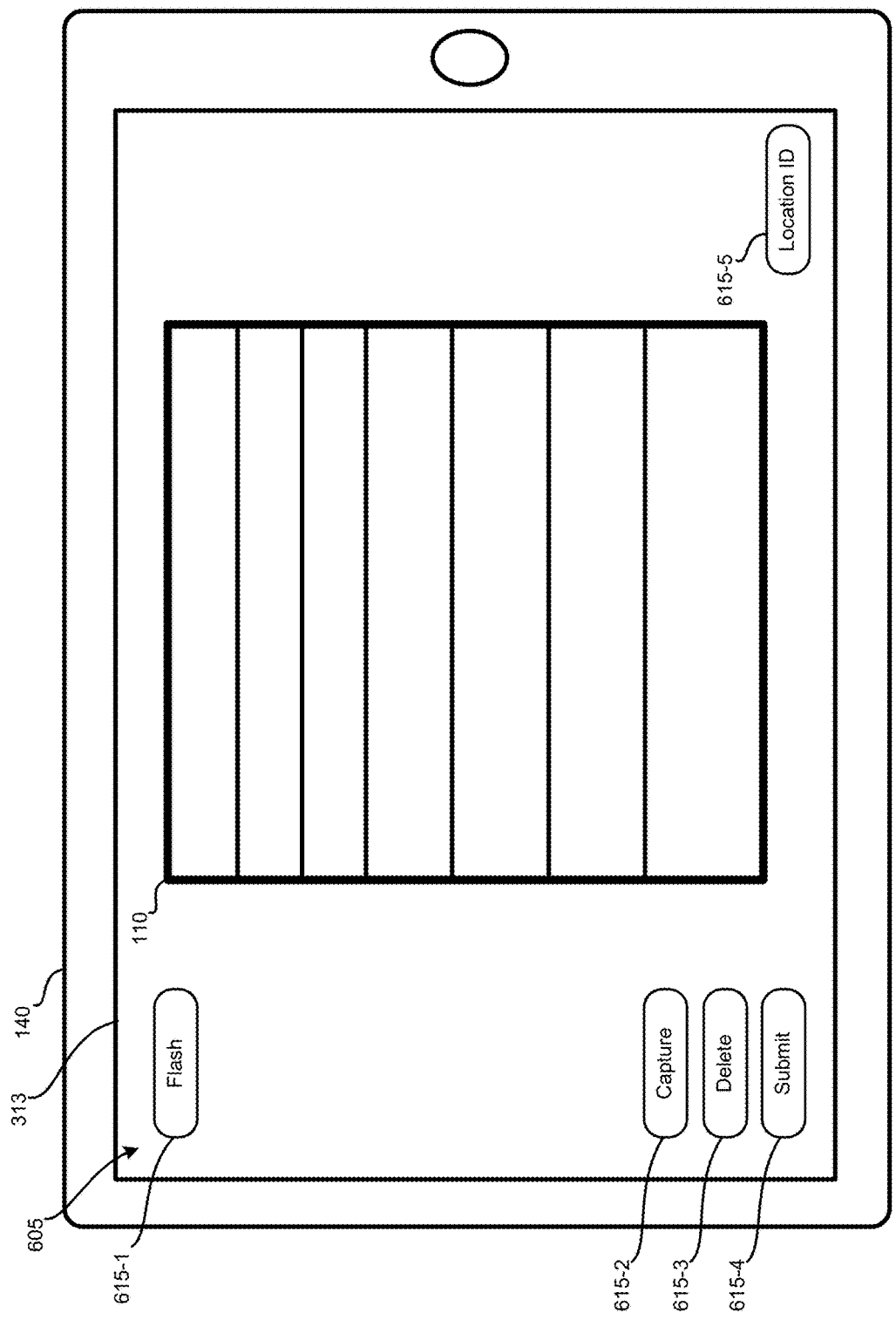
FIGS. 6-9 illustrates a particular use case of retrieving and displaying a graphic representation of a planogram, according to various embodiments of the present disclosure.

FIG. 6 illustrates an example client computing device 140 the can be used to implement various embodiments of the present disclosure. For the purposes of illustration only, the computing device 140 will be referred to herein as a tablet computer 140. One of ordinary skill in the art will recognize that the client computing device 140 may include any other device with similar components and/or functionality described above in reference to client computing device 140.

Tablet computer 140 may include an interactive user interface 313 comprising a display device and/or user input controls, such as a touchscreen display. The tablet computer 140 may execute application code stored in the memory 317 using the CPU 315 to generate the GUI 607. GUI 605 may include a viewfinder depicting an image of a location 110 captured using the camera module 311. For purposes of this example, the location 110 will be depicted as a retail display case having a number of shelves. Furthermore, in this particular example use case, the location 110 includes completely empty shelves.

The GUI 605 may also include a number of rendered controls 615 for capturing and editing the captured image, or submitting the captured image to the planogram engine 530. In some embodiments, the GUI 605 may also include controls for obtaining the location identifier associated with the image of the location 110. As discussed herein, the location identifier may be manually entered using alphanumeric text using a keypad or keyboard rendered in the GUI 605 (not shown). Alternatively, the GUI 605 may include a control 615-5 for activating one of the sensors 319 to detect a location identifier in the proximity of the location 110. For example, control 615-5 may activate a an RFID sensor, a QR code reader, a barcode reader, or other like device in the tablet computer 140 to read or detect the location identifier.

The tablet computer 140 may then send the location identifier along with the request for a compliance check or stocking instructions to the planogram engine 530. In some embodiments, an image file of the image of the location 110 may also be included in or sent with the request for the compliance check or stocking instructions. In response to the request, the remote planogram engine 530 may retrieve a predetermined planogram data store 540 that is valid during the time period during which the request is made. As discussed herein, the planogram engine 530 may then generate a graphic representation of the corresponding planogram and send it to the tablet computer 140.

Figure 7:
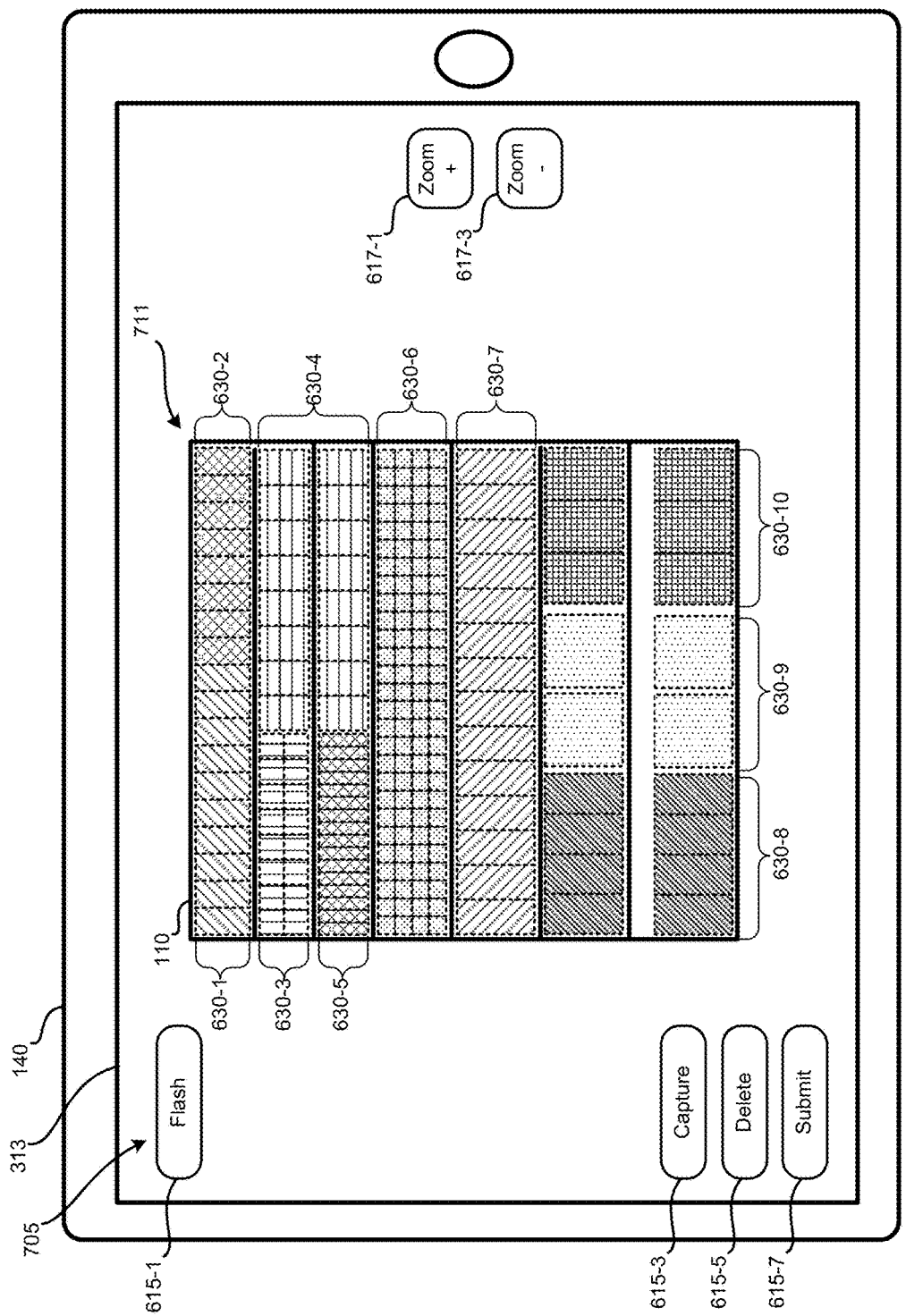

In the example GUI 705 depicted in FIG. 7, the graphic representation 711 of the corresponding planogram is a rendered image of the shelves with icons of various products 630. The position of the icons of the products 630 are indications as to how the products 630 should be arranged on the shelves of the location 110. The graphic representation 711 of the planogram in GUI 705 may show the number of the products 630, how they should be stacked, the relative positions of the products 630, and/or their physical orientation on the shelf.

In some embodiments, the graphic representation 711 of the planogram may include transparent renderings of icons that represent the products 630 through which the image of location 110 can still be seen. In such embodiments, a user may visually compare the transparent graphic representation 711 of the planogram with the actual image of the location 110 to manually determine any differences or discrepancies. For example, if the transparent rendering of the of the graphic representation of the planogram 711 shows that there should be eight boxes of product 630-2, and in reality there are only six, the user will be able to quickly determine that he or she should replenish the supply of the product 630-2.

Figure 8:
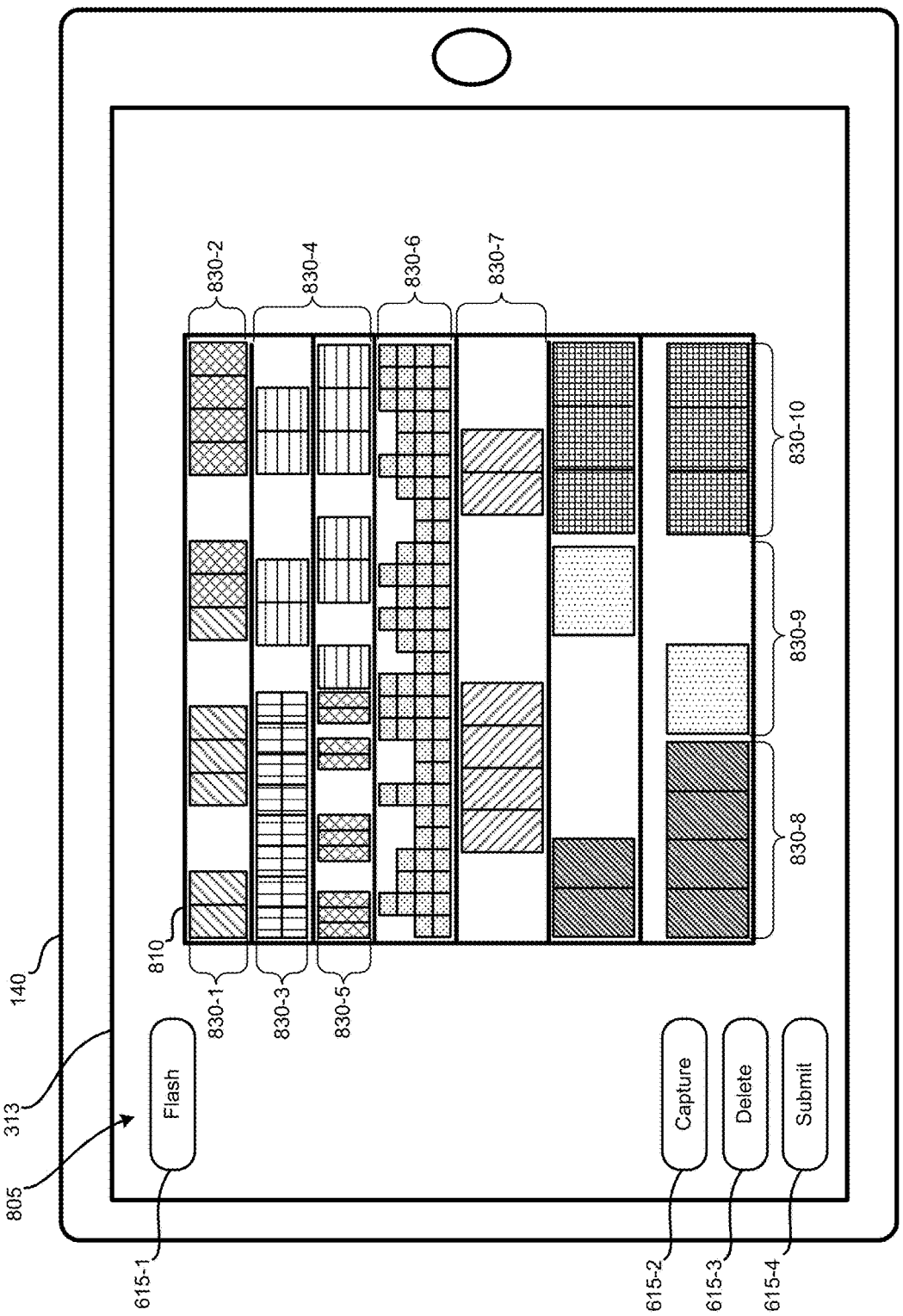

In other embodiments, discrepancies between the actual condition of the physical location and the corresponding planogram can be determined automatically by the planogram engine 530 or the client computing device 140. In either of such embodiments, the client computing device, such as the tablet computer 140 depicted in FIG. 8, may capture an image of a partially stocked shelves of location 810 using the GUI 805 rendered in the user interface device 313. The shelves of location 810 may be only partially populated with the products 830. Once the image of the location 810 is captured, tablet computer 140 can send a request for a compliance check, the location identifier, and/or the image of the shelves in location 810 to the remote planogram engine 530. The planogram engine 530 may retrieve the corresponding planogram associated with the location identifier, generate the graphic representation of the planogram, and then compare the graphic representation with the image of the location 810. Based on the comparison, the planogram engine 530 or the client computing device 140 can determine any discrepancies between the planogram and current condition of the display of products 830 in the shelves of location 810. Any regions in the graphic representation of the planogram that differ from the image of the location 810 can be indicated in the graphic representation.

Figure 9:
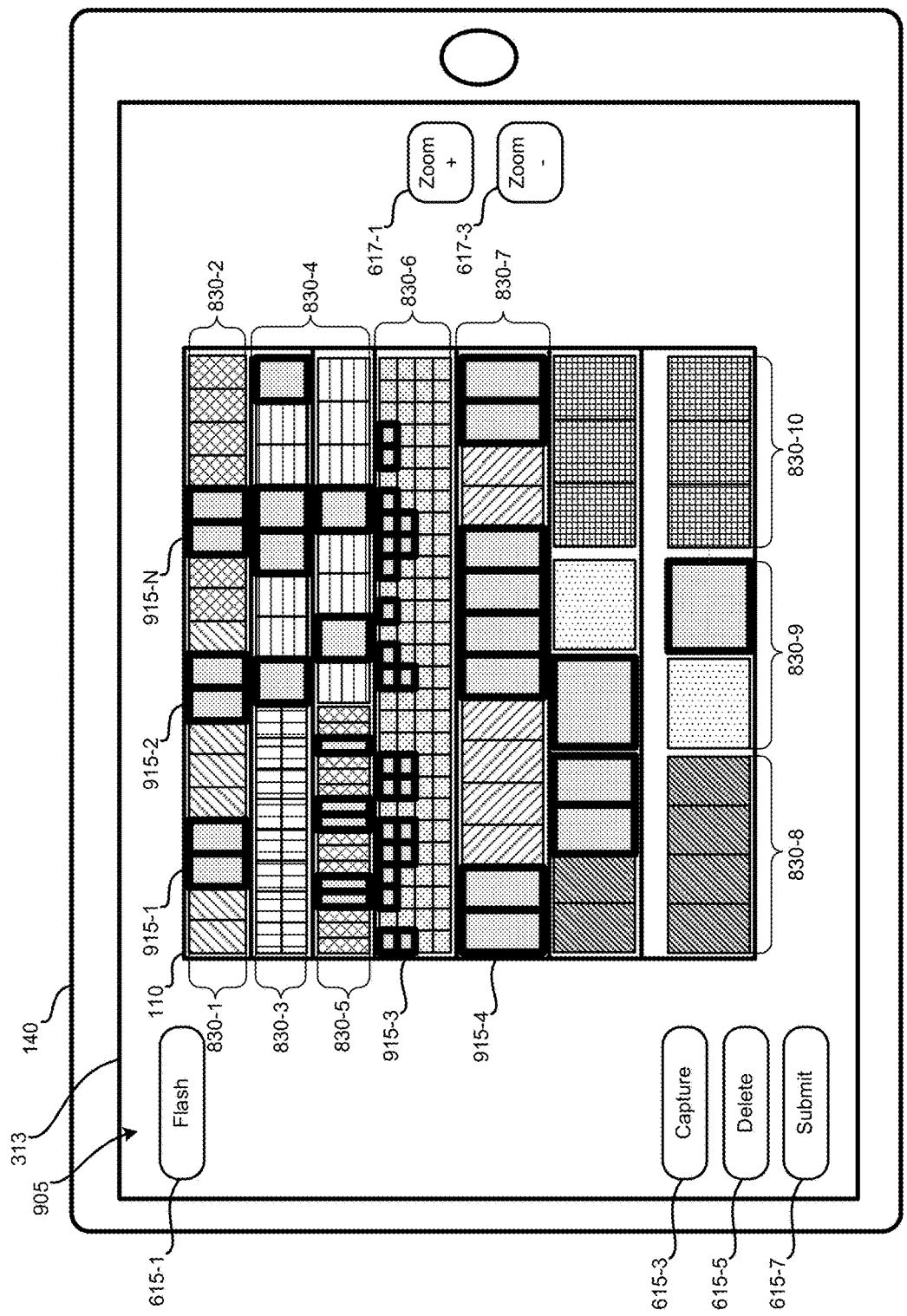

FIG. 9 illustrates example of visual indications of discrepancies between the planogram and the image of the location 810. In the example shown, regions in the location 810 that differ from the graphic representation of the planogram are marked by visual indications 915. The visual indicators 915 may include highlights, contrasting colors, blinking images, bolded outlines, and the like. The example indications 915 shown in FIG. 9 include bolded outlines superimposed over areas in the location 810 that need to be restocked or that are otherwise not in compliance with the associated planogram. The visual indicators 915 may also include indications that describe changes that must be made to the location 810. For example, indications for changes may include symbols or color coding for instructing a user to remove a particular object 830 from the location 810 because it will be moved to another location according to the specifications of another planogram. Other indications for changes may include notations or symbols that instruct the user to replace a product packaged in its original package with the same product packaged in a seasonal or promotional package (e.g., changing out jars of mayonnaise for jars of mayonnaise with attached coupons or sweepstakes literature attached).

Figure 10:
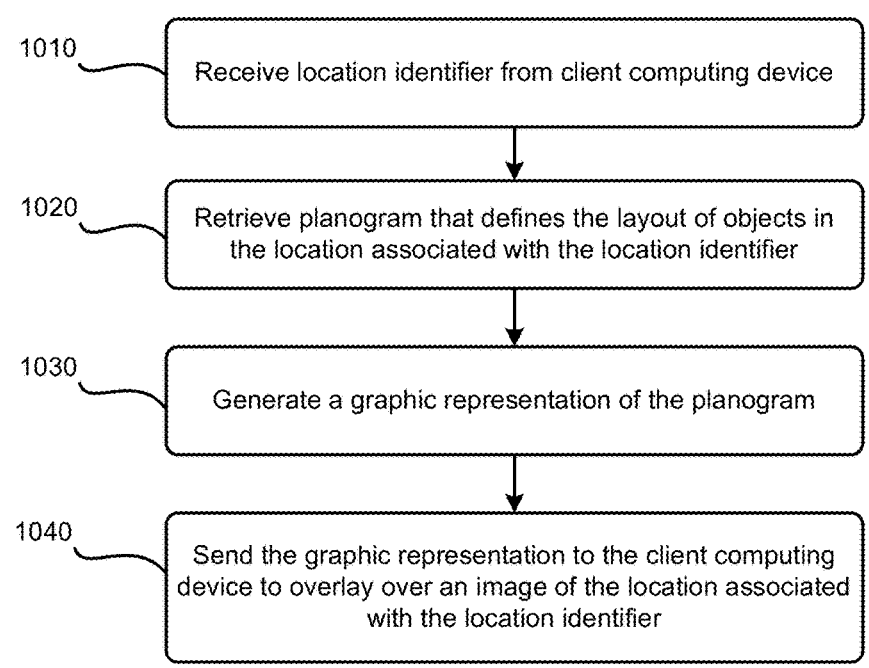
FIG. 10 is a flowchart of a method for generating and distributing graphic representations of planograms, according to various embodiments of the present disclosure

FIG. 10 is a flowchart of a method 1000 for generating graphic representations of planograms that can be sent to the client computing device to be superimposed over a real world image of a particular physical location. Method 1000 may begin at box 1010, in which a planogram engine 530 receives a location identifier from a client computing device 140. In one embodiment, the location identifier may be included or embedded in an image of a particular physical location, such as a retail display case. In such embodiments, the planogram engine 530 may analyze the contents of the image to detect and extract the location identifier. For example, the planogram engine 530 may perform an OCR operation on the image to detect and decode alphanumeric characters embedded in the image. Alternatively, the planogram engine 530 may detect one or more types of machine-readable codes (e.g., barcodes, QR codes, etc.) embedded in the image to determine the location identifier.

In box 1020, the planogram engine 530 may retrieve a planogram data file associated with location identifier from a planogram data store 540. The planogram data file may include a planogram that defines the arrangement of objects in the physical location associated with the location identifier. In some embodiments, the planogram data file may include images, or references to images, of the objects included in the planogram. Such images may include pictures, drawings, or icons that represent the individual different objects defined in the planogram.

In box 1030, the planogram engine 530 may generate a graphic representation of the planogram using the specifications defined in the planogram and the images of the objects. In some embodiments, generating a graphic representation of planogram may include arranging the images of the objects in an arrangement relative to the physical location in a rendered image. For example, the graphic representation of the planogram may include a rendered representation of a particular freezer display case having a number of shelves, hangers, and racks as well as pictures of frozen food products arranged in various configurations on the shelves, hangers, and racks according to the associated planogram. The configurations may include corresponding numbers of the images of products required by the associated planogram. Accordingly, the configurations may also include depictions of how such products should be stacked, lined up, or dispose next to one another. For example, reference to the freezer case display example, the configurations of the various products within the arrangements according to the planogram, may show how many wide variance containers of a screen should be laid on the shelves and how high they should be stacked upon one another. In some embodiments, the planogram engine 530 may render and send a composite graphic representation that includes the image of the physical location that the client computing device can immediately display without processing the graphic representation to overlay it on top of the image of the physical location.

In some embodiments, the planogram engine 530 may compare the graphic representation of the planogram associated with the physical location with the image of the physical location received from the client computing device 140. For example, the image of freezer display case received from the client computing device 140 may include images of containers of ice cream and other frozen food products on various shelves and states of depletion. The planogram engine 530 may compare the graphic representation of the associated planogram with the image of the freezer display case to determine areas of discrepancies. For any areas of the image of the freezer display that differ from the graphic representation of the associated planogram, the planogram engine 530 may render the visual indications of noncompliance in the graph representation of the planogram, such as highlighted borders of regions in the image of freezer display case that are missing specific frozen food products.

In box 1040, the planogram engine 530 may send the graphic representation of the planogram to the client computing device 140 overlay over an image of location associated with the location identifier. For example, the graphic representation of the planogram that includes the highlighted borders of regions missing particular times of ice cream may be superimposed onto the captured or live image of the freezer display case.

FIG. 11 illustrates an example computer system and networks that may be used to implement one embodiment of the present disclosure. Computer system 1110 includes a bus 1105 or other communication mechanism for communicating information, and a processor 1101 coupled with bus 1105 for processing information. Computer system 1110 also includes a memory 1102 coupled to bus 1105 for storing information and instructions to be executed by processor 1101, including instructions for performing the techniques described above. This memory may also be used for storing temporary variables or other intermediate information during execution of instructions to be executed by processor 1101. Possible implementations of this memory may be, but are not limited to, random access memory (RAM), read only memory (ROM), or both. A storage device 1103 is also provided for storing information and instructions. The information instructions can be in the form of computer readable code stored on the storage device, accessible and executable by processor to implement various techniques and methods of the present disclosure. Common forms of storage devices include non-transient, non-volatile computer readable media, for example, a hard drive, a magnetic disk, an optical disk, a CD, a DVD, a flash memory, a USB memory card, or any other medium from which a computer can read.

Computer system 1110 may be coupled via the same or different information bus, such as bus 1105, to a display 1112, such as a cathode ray tube (CRT), touchscreen, or liquid crystal display (LCD), for displaying information. An input device 1111 such as a keyboard and/or mouse is coupled to a bus for communicating information and command selections from the user to processor 1101. The combination of these components allows the user to communicate with the system.

Computer system 1110 also includes a network interface 1104 coupled with bus 1105. Network interface 1104 may provide two-way data communication between computer system 1110 and the local network 1120. The network interface 1104 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 1104 sends and receives electrical, electromagnetic, or optical signals that carry digital data streams representing various types of information.

Computer system 1110 can send and receive information, including messages or other interface actions, through the network interface 1104 to an Intranet or the Internet 1130. In the Internet example, software components or services may reside on multiple different computer systems 1110 or servers 1131 across the network.

The above description illustrates various embodiments along with examples of how aspects of such embodiments may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
   receiving, by a computer system, an image of a scene corresponding to a physical location captured by a camera on a client computing device and a time identifier indicating a time when the image of the scene of the physical location was captured by the camera on the client computing device;
   receiving, by the computer system, information relating to a location and orientation of the client computing device at the time when the image of the scene of the physical location was captured based on data generated by one or more sensor devices on the client computing device;
   receiving, by the computer system, an indication of a distance D between the physical location captured in the image and the location of the client computing device when the image was captured, the distance D measured by the one or more sensor devices that are operated on the client computing device;
   calculating, by the computer system, the location of the scene of the physical location captured in the image at the time the image was captured based on (1) the distance D between the physical location captured in the image and the location of the client computing device at the time the image was captured and (2) the location and orientation of the client computing device relative to the physical location when the image was captured,
   wherein the location of the scene of the physical location captured in the image is calculated by triangulating the location of the client computing device relative to the physical location captured in the image;
   retrieving, by the computer system, a planogram associated with the location of the scene of the physical location captured in the image and the time identifier, wherein the planogram defines an arrangement of objects in the physical location during a time range that includes the time identifier and the scene is a section of the planogram;
   generating, by the computer system, a graphic representation of the planogram, wherein the graphic representation of the planogram comprises images of the objects positioned relative to the image of the scene of the physical location; and
   transmitting, from the computer system, the graphic representation of the planogram to the client computing device for superimposing the section of the planogram onto the image of the scene of the physical location captured by the client computing device, wherein the graphic representation of the section of the planogram that is superimposed over the image of the scene changes as the image of the scene changes to a different section of the planogram.

2. The method of claim 1 further comprising receiving a location identifier by:
   receiving the image of the scene of the physical location from the client computing device; and
   analyzing the image of the scene of the physical location to determine the location identifier.

3. The method of claim 2 wherein analyzing the image of the scene of the physical location comprises:
   locating a visual representation of the location identifier in the image of the scene of the physical location; and
   decoding the visual representation of the location identifier to generate the location identifier.

4. The method of claim 1 wherein generating the graphic representation of the planogram comprises:
   analyzing the image of the scene of the physical location to determine a section of the physical location captured in the image; and
   generating the graphic representation of the section of the planogram based on the section of the physical location.

5. The method of claim 4 wherein analyzing the image of the scene of the physical location comprises analyzing sensor readings associated with image.

6. The method of claim 1 wherein retrieving the planogram comprises retrieving the images of the objects, and wherein generating the graphic representation of the planogram comprises adjusting the size of the images of the objects in response to the image of the scene of the physical location.

7. The method of claim 1 wherein generating the graphic representation of the planogram comprises:
   comparing the image of the scene of the physical location to the graphic representation of the planogram to determine discrepancies between image of the scene of the physical location and the planogram; and
   generating visual indications of the discrepancies in the graphic representation of the planogram.

8. The method of claim 1 further comprising:
   receiving a second image of a sub-section of the scene of the physical location captured by the camera of the client computing device;
   determining which part of the planogram corresponds to the sub-section of the scene of the physical location in the second image; and
   referencing a portion of the planogram that corresponds to the sub-section of the scene of the physical location captured in the second image to generate a second graphic representation of the planogram.

9. A non-transitory computer readable storage medium comprising computer programmed instructions, which when executed by a computer processor, cause the computer processor to be configured for operations comprising:
   receiving an image of a scene corresponding to a physical location captured by a camera on a client computing device and a time identifier indicating a time when the image of the scene of the physical location was captured by the camera on the client computing device;

receiving information relating to a location and orientation of the client computing device at the time when the image of the scene of the physical location was captured based on data generated by one or more sensor devices on the client computing device;

receiving an indication of a distance D between the physical location captured in the image and the location of the client computing device when the image was captured, the distance D measured by the one or more sensor devices that are operated on the client computing device;

calculating the location of the scene of the physical location captured in the image at the time the image was captured based on (1) the distance D between the physical location captured in the image and the location of the client computing device at the time the image was captured and (2) the location and orientation of the client computing device relative to the physical location when the image was captured, wherein the location of the scene of the physical location captured in the image is calculated by triangulating the location of the client computing device relative to the physical location captured in the image;

retrieving a planogram associated with the location of the scene of the physical location captured in the image and the time identifier, wherein the planogram defines an arrangement of objects in the physical location during a time range that includes the time identifier and the scene is a section of the planogram;

generating a graphic representation of the planogram, wherein the graphic representation of the planogram comprises images of the objects positioned relative to the image of the scene of the physical location; and transmitting the graphic representation of the planogram to the client computing device for superimposing the section of the planogram onto the image of the scene of the physical location captured by the client computing device, wherein the graphic representation of the section of the planogram that is superimposed over the image of the scene changes as the image of the scene changes to a different section of the planogram.

10. The non-transitory computer readable medium of claim 9 further comprising receiving a location identifier by:
receiving the image of the scene of the physical location from the client computing device; and
analyzing the image of the scene of the physical location to determine the location identifier.

11. The non-transitory computer readable medium of claim 10 wherein analyzing the image of the scene of the physical location comprises:
locating a visual representation of the location identifier in the image of the scene of the physical location; and
decoding the visual representation of the location identifier to generate the location identifier.

12. The non-transitory computer readable medium of claim 9 wherein generating the graphic representation of the planogram comprises:
analyzing the image of the scene of the physical location to determine a section of the physical location captured in the image; and
generating the graphic representation of the section of the planogram based on the section of the physical location.

13. The non-transitory computer readable medium of claim 9 wherein retrieving the planogram comprises retrieving the images of the objects, and wherein generating the graphic representation of the planogram comprises adjusting the size of the images of the objects in response to the image of the scene of the physical location.

14. The non-transitory computer readable medium of claim 9 wherein generating the graphic representation of the planogram comprises:
comparing the image of the scene of the physical location to the graphic representation of the planogram to determine discrepancies between image of the scene of the physical location and the planogram; and
generating visual indications of the discrepancies in the graphic representation of the planogram.

15. A system comprising:
a computer processor; and
a non-transitory computer readable medium coupled to the computer processor and comprising instructions, which when executed by the computer processor, cause the computer processor to be configured to:
receive an image of a scene corresponding to a physical location captured by a camera on a client computing device and a time identifier indicating a time when the image of the scene of the physical location was captured by the camera on the client computing device;
receive information relating to a location and orientation of the client computing device at the time when the image of the scene of the physical location was captured based on data generated by one or more sensor devices on the client computing device;
receive an indication of a distance D between the physical location captured in the image and the location of the client computing device when the image was captured, the distance D measured by the one or more sensor devices that are operated on the client computing device;
calculate the location of the scene of the physical location captured in the image at the time the image was captured based on (1) the distance D between the physical location captured in the image and the location of the client computing device at the time the image was captured and (2) the location and orientation of the client computing device relative to the physical location when the image was captured,
wherein the location of the scene of the physical location captured in the image is calculated by triangulating the location of the client computing device relative to the physical location captured in the image;
retrieve a planogram associated with the location of the scene of the physical location captured in the image and the time identifier, wherein the planogram defines an arrangement of objects in the physical location during a time range that includes the time identifier and the scene is a section of the planogram;
generate a graphic representation of the planogram, wherein the graphic representation of the planogram comprises images of the objects positioned relative to the image of the scene of the physical location; and
transmit the graphic representation of the planogram to the client computing device for superimposing the section of the planogram onto the image of the scene of the physical location captured by the client computing device, wherein the graphic representation of the section of the planogram that is superimposed over the image of the scene changes as the image of the scene changes to a different section of the planogram.

16. The system of claim 15 wherein the computer processor is further configured to receive a location identifier by:

receiving the image of the scene of the physical location from the client computing device; and analyzing the image of the physical location to determine the location identifier.

17. The system of claim 16 wherein the code that causes the computer processor to be configured to analyze the image of the scene of the physical location further causes the computer processor to be configured to:

locate a visual representation of the location identifier in the image of the scene of the physical location; and decode the visual representation of the location identifier to generate the location identifier.

18. The system of claim 15 wherein the code that causes the computer processor to be configured to generate the graphic representation of the planogram further causes the computer processor to be configured to:

analyze the image of the scene corresponding to the physical location to determine the section of the physical location captured in the image; and generate the graphic representation of the section of the planogram based on the section of the physical location.

19. The system of claim 15 wherein the code that causes the computer processor to be configured to generate the graphic representation of the planogram further causes the computer processor to be configured to:

compare the image of the scene of the physical location to the graphic representation of the planogram to determine discrepancies between image of the physical location and the planogram; and generate visual indications of the discrepancies in the graphic representation of the planogram.

20. A method comprising:

receiving, by a computer system, an image of a scene corresponding to a physical location captured by a camera on a mobile device and a time identifier indicating a time when the image was captured;

receiving, by the computer system, information relating to a location and orientation of the mobile device at the time when the image was captured based on data generated by one or more sensor devices on the mobile device;

receiving, by the computer system, a measurement of a distance between the physical location captured in the image and the location of the mobile device at the time when the image was captured, wherein the measurement of the distance is captured by the mobile device operating the one or more sensor devices to measure the distance, the one or more sensor devices including one or more of an infrared range finder, a near field communication (NFC) transceiver, and a global positioning system (GPS);

calculating, by the computer system, the location of the scene of the physical location captured in the image at the time the image was captured based on (1) the distance D between the physical location captured in the image and the location of the client computing device at the time the image was captured and (2) the location and orientation of the client computing device relative to the physical location when the image was captured, wherein the location of the scene of the physical location captured in the image is calculated by triangulating the location of the client computing device relative to the physical location captured in the image;

retrieving, by the computer system, a planogram associated with the location of the scene of the physical location captured in the image and the time identifier, wherein the planogram describes an arrangement of objects in the physical location during a time range that includes the time identifier and the scene is a section of the planogram;

generating, by the computer system, a graphic representation of the planogram comprising images of the objects positioned relative to the image of the scene of the physical location; and transmitting, by the computer system, the graphic representation of the planogram to the mobile device for display of the graphic representation of the section of the planogram over the image of the scene of the physical location captured by the mobile device, wherein the graphic representation of the section of the planogram that is displayed over the image of the scene changes as the image of the scene changes to a different section of the planogram.

21. The method of claim 20 further comprising:

tracking changes in an image stream of the scene of the physical location based on readings from the one or more sensor devices as a user pans or tilts the mobile device camera to scan different sections of the physical location; and automatically updating the superimposed graphic representation of the planogram changes as portions of the physical location displayed in a viewfinder of the mobile device camera change with user movement of the mobile device camera.

22. The method of claim 20 further comprising associating readings from the one or more sensor devices with images in the image stream of the scene of the physical location.

* * * * *